(12) United States Patent
Xiao et al.

(10) Patent No.: US 12,512,111 B2
(45) Date of Patent: Dec. 30, 2025

(54) METHODS AND SYSTEMS FOR VOICE ENHANCEMENT

(71) Applicant: SHENZHEN SHOKZ CO., LTD., Guangdong (CN)

(72) Inventors: Le Xiao, Shenzhen (CN); Chengqian Zhang, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 181 days.

(21) Appl. No.: 18/354,715

(22) Filed: Jul. 19, 2023

(65) Prior Publication Data
US 2023/0360664 A1 Nov. 9, 2023

Related U.S. Application Data

(63) Continuation of application No. PCT/CN2021/096375, filed on May 27, 2021.

(51) Int. Cl.
*G10L 21/0264* (2013.01)
*G10L 21/02* (2013.01)
(Continued)

(52) U.S. Cl.
CPC .......... *G10L 21/0264* (2013.01); *G10L 21/02* (2013.01); *G10L 21/0208* (2013.01); *G10L 25/21* (2013.01); *G10L 2021/02166* (2013.01)

(58) Field of Classification Search
CPC . G10L 21/0264; G10L 21/02; G10L 21/0208; G10L 25/21; G10L 2021/02166
See application file for complete search history.

(56) References Cited

U.S. PATENT DOCUMENTS 8,660,281 B2 * 2/2014 Bouchard .............. H04R 25/43
    704/226
9,286,908 B2 * 3/2016 Zhang ................. G10L 21/0208
(Continued)

FOREIGN PATENT DOCUMENTS

CN    102509552 A    6/2012
CN    109473118 A    3/2019
(Continued)

OTHER PUBLICATIONS

Guérin, A. "A Two-Sensor Voice Activity Detection and Speech Enhancement based on Coherence with Additional Enhancement of Low Frequencies using Pitch Information", Sep. 2000, 10th European Signal Processing Conference. (Year: 2000).*
(Continued)

*Primary Examiner* — Daniel C Washburn
*Assistant Examiner* — James Boggs
(74) *Attorney, Agent, or Firm* — METIS IP LLC

(57) ABSTRACT

The present disclosure provides a method for voice enhancement, including: obtaining a first signal and a second signal of a target voice, the first signal being a signal of the target voice collected based on a first position, and the second signal being a signal of the target voice collected based on a second position; determining a first coefficient by processing, based on a position of the target voice, the first position, and the second position, the first signal and the second signal; determining, based on the first signal and the second signal, a plurality of parameters related to a plurality of sound source directions; determining, based on the plurality of parameters and the position of the target voice, a second coefficient; and obtaining a voice-enhanced first output voice signal corresponding to the target voice by processing the first signal and/or the second signal.

19 Claims, 11 Drawing Sheets

(51) Int. Cl.
*G10L 21/0208* (2013.01)
*G10L 21/0216* (2013.01)
*G10L 25/21* (2013.01)

(56) References Cited

U.S. PATENT DOCUMENTS

| | | | |
|---|---|---|---|
| 9,723,422 B2* | 8/2017 | Jensen | H04R 29/005 |
| 10,186,277 B2* | 1/2019 | Salishev | G10L 21/0216 |
| 11,430,421 B2* | 8/2022 | Kemmerer | G10K 11/16 |
| 2010/0241426 A1 | 9/2010 | Zhang et al. | |
| 2022/0328058 A1* | 10/2022 | Kang | G10L 21/0232 |

FOREIGN PATENT DOCUMENTS

| | | |
|---|---|---|
| CN | 109616136 A | 4/2019 |
| CN | 110856072 A | 2/2020 |
| CN | 112116918 A | 12/2020 |
| CN | 112735370 A | 4/2021 |
| CN | 112802486 A | 5/2021 |
| KR | 20090037845 A | 4/2009 |

OTHER PUBLICATIONS

Biswas, Tanmay, Sudhindu Bikash Mandal, Debasri Saha, and Amlan Chakrabarti, "FPGA based dual microphone speech enhancement", Jan. 2019, Microsystem Technologies, vol. 25, No. 3, pp. 765-775. (Year: 2019).*

Yousefian, Nima, Ahmad Akbari, and Mohsen Rahmani, "Using power level difference for near field dual-microphone speech enhancement", May 2009, Applied Acoustics, vol. 70, No. 11-12, pp. 1412-1421. (Year: 2009).*

Xu, Chundong, Bin Zhou, and Lang Xu, "Adaptive Speech Enhancement Algorithm Based on First-order Differential Microphone Array", Mar. 2021, 2021 IEEE 2nd International Conference on Big Data, Artificial Intelligence and Internet of Things Engineering (ICBAIE 2021), pp. 41-44. (Year: 2021).*

Yousefian, Nima, and Philipos C. Loizou, "A Dual-Microphone Speech Enhancement Algorithm Based on the Coherence Function", Feb. 2012, IEEE Transactions on Audio, Speech, and Language Processing, vol. 20, No. 2, pp. 599-609. (Year: 2012).*

Abdelaziz, Trabelsi, Boyer François-Raymond, and Savaria Yvon, "Real-Time Dual-Microphone Speech Enhancement", 2012, Speech Enhancement, Modeling and Recognition-Algorithms and Applications, IntechOpen, pp. 19-34. (Year: 2012).*

Zhang, Heng, Qiang Fu, and Yonghong Yan, "A Frequency Domain Approach For Speech Enhancement With Directionality Using Compact Microphone Array", Sep. 2008, Interspeech 2008, pp. 447-450. (Year: 2008).*

International Search Report in PCT/CN2021/096375 mailed on Dec. 28, 2021, 6 pages.

Jacob Benesty et al., Study and Design of Differential Microphone Arrays, Springer Topics in Signal Processing, 2013, 184 pages.

Luo, Falong et al., Adaptive Null-Forming Scheme in Digital Hearing Aids, IEEE Transactions on Signal Processing, 50(7): 1583-1590, 2002.

Gary W. Elko et al., A Simple Adaptive First-Order Differential Microphone, Proceedings of 1995 Workshop on Applications of Signal Processing to Audio and Accoustics, 1995, 4 pages.

First Office Action in Chinese Application No. 202110587365.9 mailed on May 31, 2025, 24 pages.

* cited by examiner

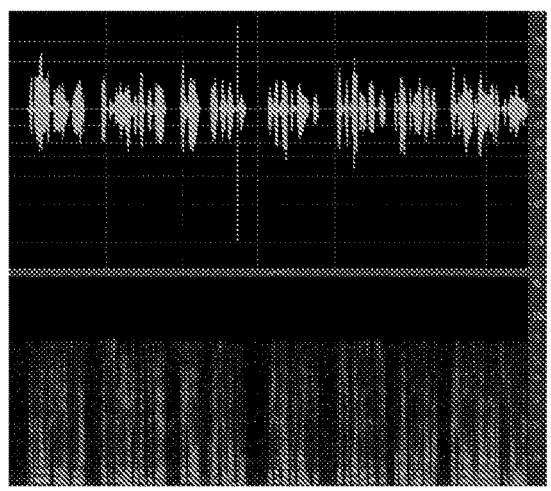
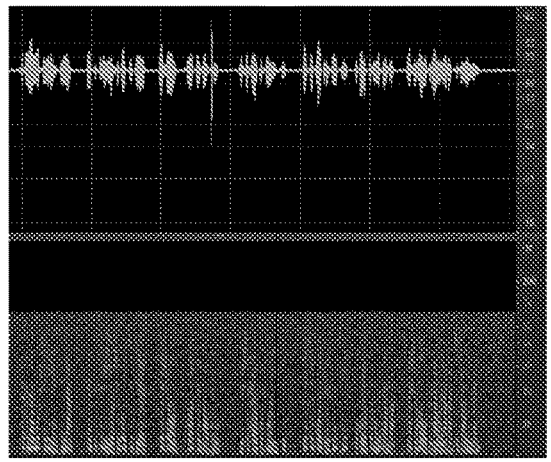
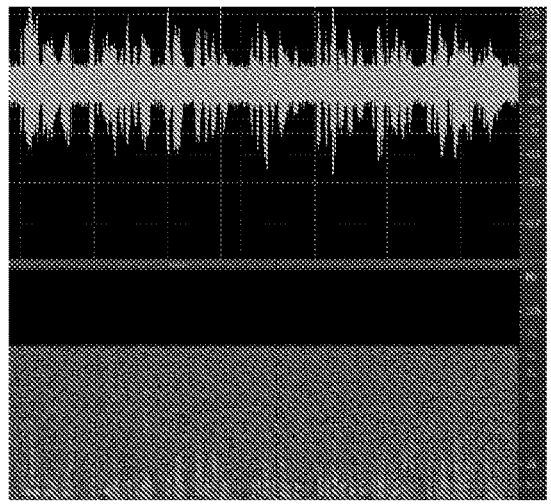
FIG. 7

800

```
810 — obtaining a signal pointing to a first direction and a signal pointing to a second direction by performing, based on a position of a target voice, a first position, and a second position, a differential operation on a first signal and a second signal 820 — Determining a fourth signal by performing an adaptive differential operation on the signal pointing to the first direction and the signal pointing to the second direction 830 — Obtaining a third signal by enhancing a low-frequency component in the fourth signal 840 — Determining a first coefficient based on the third signal
```

FIG. 8

METHODS AND SYSTEMS FOR VOICE ENHANCEMENT

CROSS-REFERENCE TO RELATED APPLICATION

This application is a continuation of International Application No. PCT/CN2021/096375, filed on May 27, 2021, the contents of which are entirely incorporated herein by reference.

TECHNICAL FIELD

The present disclosure relates to a field of computer technology, and in particular, to a method and a system for voice enhancement.

BACKGROUND

With the development of voice processing technology, the quality requirements of voice signals are getting higher and higher in technical fields such as communication and a voice collection. In scenarios such as a voice call, a voice signal collection, etc., there may be interferences from various noise signals such as environmental noise, other people's voices, etc., which may result in that a collected target voice is not a clean voice signal, thereby affecting a quality of the voice signal and resulting in an inaudible voice and a poor call quality.

Therefore, it is desirable to provide a method and a system for voice enhancement.

SUMMARY

One of the embodiments of the present disclosure provides a method for voice enhancement. The method may include obtaining a first signal and a second signal of a target voice, the first signal being a signal of the target voice collected based on a first position, and the second signal being a signal of the target voice collected based on a second position; determining a first coefficient by processing, based on a position of the target voice, the first position, and the second position, the first signal and the second signal; determining, based on the first signal and the second signal, a plurality of parameters related to a plurality of sound source directions, each parameter of the plurality of parameters corresponding to a probability that a sound is emitted from a sound source direction to form the first signal and the second signal; determining, based on the plurality of parameters and the position of the target voice, a second coefficient; and obtaining a voice-enhanced first output voice signal corresponding to the target voice by processing, based on the first coefficient and the second coefficient, the first signal and/or the second signal.

In some embodiments, the determining a first coefficient by processing, based on a position of the target voice, the first position, and the second position, the first signal and the second signal may include: obtaining a signal pointing to a first direction and a signal pointing to a second direction by performing, based on the position of the target voice, the first position, and the second position, a differential operation on the first signal and the second signal, the signal pointing to the first direction and the signal pointing to the second direction containing different proportions of a valid signal; determining a third signal corresponding to the valid signal based on the signal pointing to the first direction and the signal pointing to the second direction; and determining the first coefficient based on the third signal.

In some embodiments, the determining a third signal corresponding to the valid signal may include: determining a fourth signal by performing an adaptive differential operation on the signal pointing to the first direction and the signal pointing to the second direction; and obtaining the third signal by enhancing a low-frequency component in the fourth signal.

In some embodiments, the method may further include: updating one or more adaptive parameters of the adaptive differential operation based on the fourth signal, the signal pointing to the first direction, and the signal pointing to the second direction.

In some embodiments, the determining a first coefficient by processing, based on a position of the target voice, the first position, and the second position, the first signal and the second signal may include: obtaining a signal pointing to the first direction and a signal pointing to the second direction by performing, based on the position of the target voice, the first position, and the second position, a differential operation on the first signal and the second signal, the signal pointing to the first direction and the signal pointing to the second direction containing different proportions of a valid signal; determining an estimated signal-to-noise ratio (SNR) of the target voice based on the signal pointing to the first direction and the signal pointing to the second direction; and determining the first coefficient based on the estimated SNR.

In some embodiments, the determining, based on the first signal and the second signal, a plurality of parameters related to a plurality of sound source directions may include: determining one or more parameters related to each sound source direction by performing, based on the each sound source direction, the first position, and the second position, a differential operation on the first signal and the second signal.

In some embodiments, the determining, based on the plurality of parameters and the position of the target voice, a second coefficient may include: determining a direction of a synthetic sound source based on the plurality of parameters; and determining, based on the direction of the synthetic sound source and the position of the target voice, the second coefficient.

In some embodiments, the determining, based on the direction of the synthetic sound source and the position of the target voice, the second coefficient may include: determining whether the position of the target voice is located in the direction of the synthetic sound source; in response to determining that the position of the target voice is located in the direction of the synthetic sound source, setting the second coefficient as a first value; or in response to determining that the position of the target voice is not located in the direction of the synthetic sound source, setting the second coefficient as a second value.

In some embodiments, the determining, based on the direction of the synthetic sound source and the position of the target voice, the second coefficient may include: determining, based on an angle between the position of the target voice and the direction of the synthetic sound source, the second coefficient using a regression function.

In some embodiments, the method may further include: performing a smoothing operation on the second coefficient based on a smoothing factor.

In some embodiments, the method may further include performing at least one of the following operations on the first signal and the second signal: framing the first signal and the second signal; performing a windowed smoothing operation on the first signal and the second signal; or converting the first signal and the second signal to a frequency domain.

In some embodiments, the method may further include: determining at least one target sub-band signal in the first output voice signal; and obtaining a second output voice signal by processing, based on a single-mic filtering algorithm, the at least one target sub-band signal.

In some embodiments, the determining at least one target sub-band signal in the first output voice signal may include: obtaining a plurality of sub-band signals based on the first output voice signal; determining an SNR of each of the sub-band signals; and determining, based on the SNR of each of the sub-band signals, the target sub-band signal.

In some embodiments, the method may further include: determining a third coefficient by processing, based on a single-mic filtering algorithm, the first signal and/or the second signal; and obtaining a third output voice signal by processing, based on the third coefficient, the first output voice signal.

In some embodiments, the method may further include: determining a fourth coefficient based on a power level difference between the first signal and the second signal; and obtaining a voice-enhanced fourth output voice signal corresponding to the target voice by processing, based on the first coefficient, the second coefficient, and the fourth coefficient, the first signal and/or the second signal.

In some embodiments, the determining a fourth coefficient based on a power level difference between the first signal and the second signal may include: obtaining a noise power spectral density based on a silent interval in the first signal and the second signal; obtaining the power level difference based on a first power spectral density of the first signal, a second power spectral density of the second signal, and the noise power spectral density; and determining the fourth coefficient based on the power level difference and the noise power spectral density.

One of the embodiments of the present disclosure provides a system for voice enhancement. The system may include: at least one storage medium including a group of instructions; and at least one processor in communication with the at least one storage medium, wherein when executing the group of instructions, the at least one processor is directed to cause the system to: obtain a first signal and a second signal of a target voice, the first signal being a signal of the target voice collected based on a first position, and the second signal being a signal of the target voice collected based on a second position; determine a first coefficient by processing, based on a position of the target voice, the first position, and the second signal; determine, based on the first signal and the second signal, a plurality of parameters related to a plurality of sound source directions, each parameter of the plurality of parameters corresponding to a probability that a sound is emitted from a sound source direction to form the first signal and the second signal; determine, based on the plurality of parameters and the position of the target voice, a second coefficient; and obtain a voice-enhanced first output voice signal corresponding to the target voice by processing, based on the first coefficient and the second coefficient, the first signal and/or the second signal.

One of the embodiments of the present disclosure provides a system for voice enhancement. The system may include an acquisition module, a processing module, and a generation module. The obtaining module may be configured to obtain a first signal and a second signal of a target voice, the first signal being a signal of the target voice collected based on a first position, and the second signal being a signal of the target voice collected based on a second position. The processing module may be configured to determine a first coefficient by processing, based on a position of the target voice, the first position, and the second position, the first signal and the second signal; determine, based on the first signal and the second signal, a plurality of parameters related to a plurality of sound source directions, each parameter of the plurality of parameters corresponding to a probability that a sound is emitted from a sound source direction to form the first signal and the second signal; and determine, based on the plurality of parameters and the position of the target voice, a second coefficient. The generation module may be configured to obtain a voice-enhanced first output voice signal corresponding to the target voice by processing, based on the first coefficient and the second coefficient, the first signal and/or the second signal.

One of the embodiments of the present disclosure provides a non-transitory computer-readable storage medium storing computer instructions that, when executed by at least one processor, direct the at least one processor to perform the method of the present disclosure.

Additional features will be set forth partially in the following descriptions. The features may be apparent to those skilled in the art upon examination of the following contents and accompanying drawings, or may be learned by actual production or operation of the embodiments. The features of the present disclosure may be implemented and obtained by practicing or using various aspects of the methods, means and combinations set forth in the following detailed embodiments.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is a schematic diagram illustrating a filtering effect of an adaptive null-forming (ANF) algorithm at different noise angles according to some embodiments of the present disclosure;

FIG. 8 is a flowchart illustrating an exemplary process for determining a first coefficient according to some embodiments of the present disclosure;

DETAILED DESCRIPTION

Figure 1:
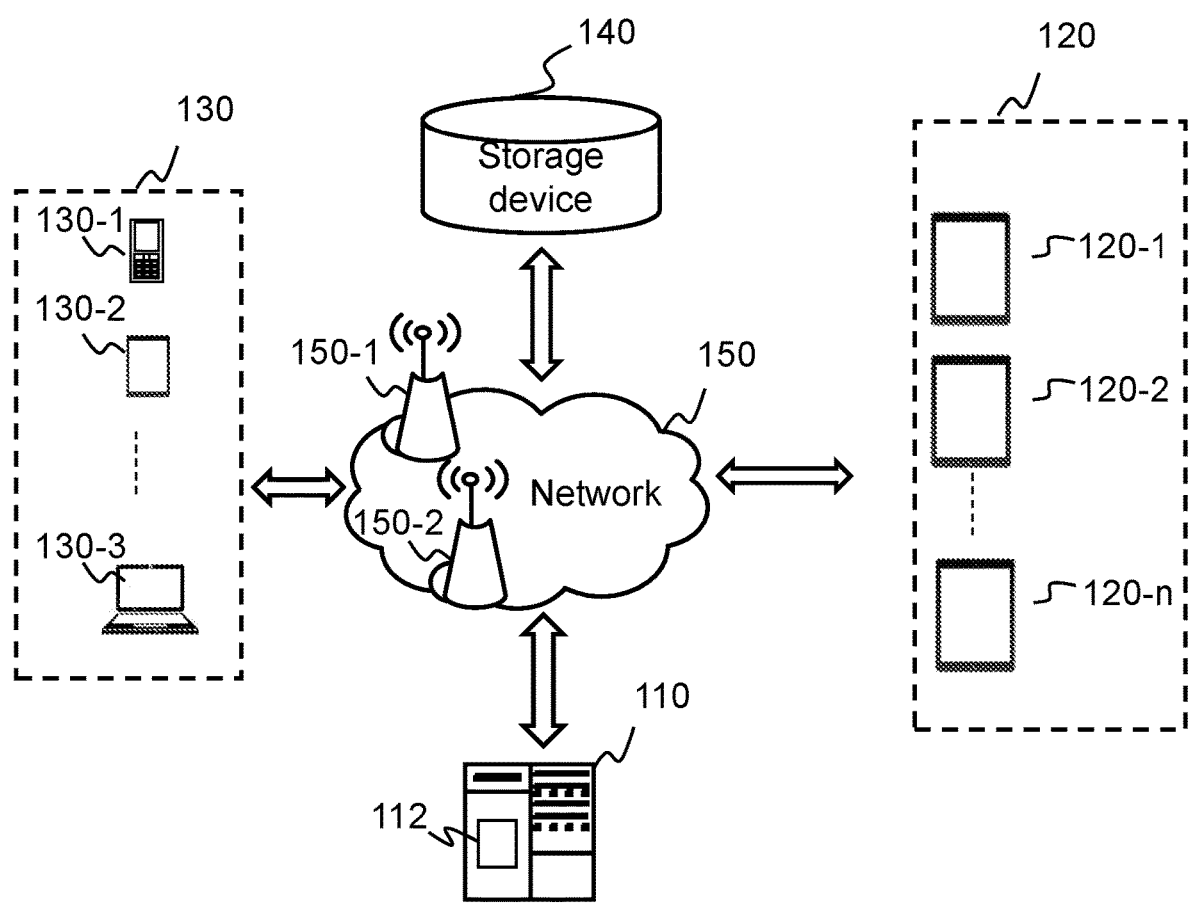
FIG. 1 is a schematic diagram illustrating an application scenario of a system for voice enhancement according to some embodiments of the present disclosure.

In order to more clearly illustrate the technical solutions related to the embodiments of the present disclosure, a brief introduction of the drawings referred to the description of the embodiments is provided below. Apparently, the accompanying drawings in the following descriptions are only some examples or embodiments of the present disclosure, and those skilled in the art may further apply the present disclosure to other similar scenarios. It should be understood that the exemplary embodiments are provided merely for better comprehension and application of the present disclosure by those skilled in the art, and not intended to limit the scope of the present disclosure. Unless obviously obtained from the context or the context illustrates otherwise, the same numeral in the drawings refers to the same structure or operation.

As indicated in the present disclosure and the claims, the terms "a," "an," "one," and/or "the" are not specific to the singular and may include the plural unless the context clearly indicates an exception. In general, the terms "comprise," "comprises," and/or "comprising," "include," "includes," and/or "including" merely prompt to include operations and elements that have been clearly identified, and these operations and elements do not constitute an exclusive listing. The methods or devices may further include other operations or elements. The term "based on" means "based at least in part on." The term "one embodiment" means "at least one embodiment." The term "another embodiment" means "at least one further embodiment."

The flowcharts are used in the present disclosure to illustrate the operations performed by the system according to the embodiment of the present disclosure. It should be understood that the preceding or following operations are not necessarily performed in the exact order. Instead, various operations may be processed in reverse order or simultaneously. At the same time, other operations may be added to these procedures, or a certain operation or operations may be removed from these procedures.

FIG. 1 is a schematic diagram illustrating an application scenario of a system for voice enhancement according to some embodiments of the present disclosure. A system for voice enhancement 100 shown in some embodiments of the present disclosure may be applied in various software, systems, platforms, and devices to implement an enhancement processing of a voice signal. For example, the system for voice enhancement 100 may be applied to perform the voice enhancement processing on a user's voice signal obtained by various software, systems, platforms, and devices, and may be further applied to perform the voice enhancement processing on a voice call when using a device (e.g., a mobile phone, a tablet, a computer, an earphone, etc.)

In the voice call scene, there may be interferences from various noise signals such as environmental noise, other people's voices, etc., which may result in that a collected target voice is not a clean voice signal. To improve the quality of the voice call, a voice enhancement operation such as a noise filtering operation, a voice signal enhancement operation, etc. may be performed on the target voice to obtain a clean voice signal. The embodiments of the present disclosure provide a system and a method for voice enhancement, which may implement, for example, the enhancement processing on the target voice in the above-mentioned voice call scene.

As shown in FIG. 1, the system for voice enhancement 100 may include a processing device 110, a collection device 120, a terminal device 130, a storage device 140, and a network 150.

In some embodiments, the processing device 110 may process data and/or information obtained from other devices or system components. The processing device 110 may execute program instructions based on the data, information and/or processing results to perform one or more functions described in the present disclosure. For example, the processing device 110 may obtain and process a first signal and a second signal of the target voice, and output a voice-enhanced output voice signal.

Figure 2:
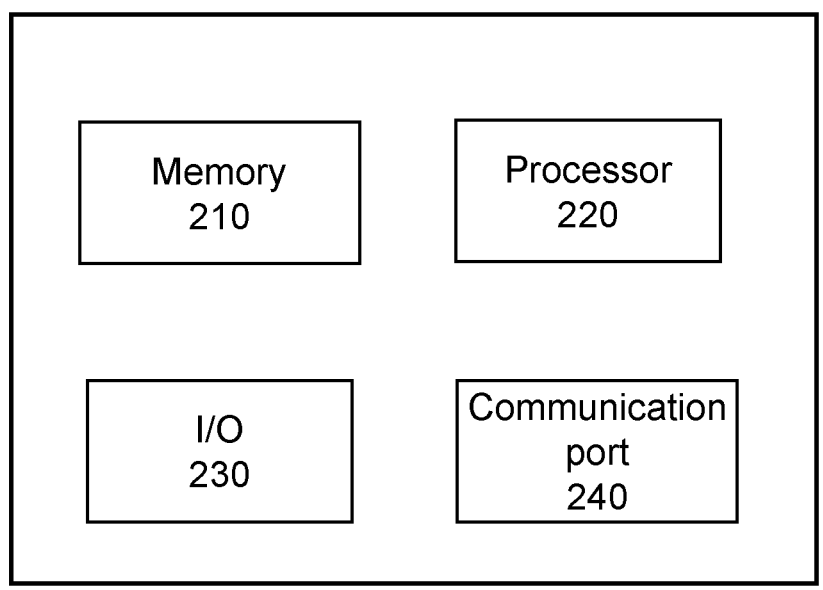
FIG. 2 is a schematic diagram illustrating an exemplary computing device according to some embodiments of the present disclosure.

In some embodiments, the processing device 110 may be a single processing device or a group of processing devices, such as a server or a group of servers. The group of processing devices may be centralized or distributed (e.g., the processing device 110 may be a distributed system). In some embodiments, the processing device 110 may be local or remote. For example, the processing device 110 may access information and/or data in the collection device 120, the terminal 130, and the storage device 140 through the network 150. As another example, the processing device 110 may be directly connected to the collection device 120, the terminal 130, and the storage device 140 to access information and/or data stored therein. In some embodiments, the processing device 110 may be implemented on a cloud platform. Merely by way of example, the cloud platform may include a private cloud, a public cloud, a hybrid cloud, a community cloud, a distributed cloud, an inter-cloud, a multi-cloud, etc., or any combination thereof. In some embodiments, the processing device 110 may be implemented on a computing device as shown in FIG. 2 of the present disclosure. For example, the processing device 110 may be implemented on one or more components of a computing device 200 as shown in FIG. 2.

In some embodiments, processing device 110 may include a processing engine 112. The processing engine 112 may process data and/or information related to the voice enhancement to perform one or more methods or functions described in the present disclosure. For example, the processing engine 112 may obtain the first signal and the second signal of the target voice. The first signal may be a signal of the target voice collected based on a first position, and the second signal may be a signal of the target voice collected based on a second position. In some embodiments, the processing engine 112 may process the first signal and/or the second signal to obtain the voice-enhanced output voice signal corresponding to the target voice.

In some embodiments, the processing engine 112 may include one or more processing engines (e.g., a single-chip processing engine or a multi-chip processor). For example, the processing engine 112 may include a central processing unit (CPU), an application specific integrated circuit (ASIC), an application specific instruction set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction set computer (RISC), a micro-processor, etc., or any combination thereof. In some embodiments, the processing engine 112 may be integrated in the collection device 120 or the terminal 130.

In some embodiments, the collection device 120 may be configured to collect the voice signal of the target voice, for example, to collect the first signal and the second signal of the target voice. In some embodiments, the collection device 120 may be a single collection device, or a collection device group including a plurality of collection devices. In some embodiments, the collection device 120 may be a device (e.g., a mobile phone, an earphone, a walkie-talkie, a tablet, a computer, etc.) including one or more microphones or other voice sensors (e.g., 120-1, 120-2, . . . , 120-n). For example, the collection device 120 may include at least two microphones, the at least two microphones being separated by a certain distance. When the collection device 120 collects the voice of the user, the at least two microphones may simultaneously collect the voice from the user's mouth at different positions. The at least two microphones may include a first microphone and a second microphone. The first microphone may be disposed closer to the user's mouth, the second microphone may be disposed farther away from the user's mouth, and a line connecting the second microphone and the first microphone may extend toward a position of the user's mouth.

The collection device 120 may convert the collected voice into an electrical signal, and send the electrical signal to the processing device 110 for processing. For example, the first microphone and the second microphone may convert the user's voice into the first signal and the second signal, respectively. The processing device 110 may implement the voice enhancement operation based on the first signal and the second signal.

In some embodiments, the collection device 120 may transmit the information and/or data to the processing device 110, the terminal 130, and the storage device 140 through the network 150. In some embodiments, the collection device 120 may be directly connected to the processing device 110 or the storage device 140 to transmit the information and/or data. For example, the collection device 120 and the processing device 110 may be different portions of a same electronic device (e.g., an earphone, glasses, etc.), and the different portions may be connected by metal wires.

In some embodiments, the terminal 130 may be a terminal used by the user or other entity. For example, the terminal 130 may include a terminal used by a sound source (e.g., a person or other entity) corresponding to the target voice, or a terminal used by other users or entities performing a voice call with the sound source (e.g., a person or other entity) corresponding to the target voice.

In some embodiments, the terminal 130 may include a mobile device 130-1, a tablet 130-2, a laptop 130-3, etc., or any combination thereof. In some embodiments, the mobile device 130-1 may include a smart home device, a wearable device, a smart mobile device, a virtual reality device, an augmented reality device, etc., or any combination thereof. In some embodiments, the smart home devices may include a smart lighting device, a smart electrical control device, a smart monitoring device, a smart TV, a smart camera, a walkie-talkie, etc., or any combination thereof. In some embodiments, the wearable device may include a smart bracelet, a smart footwear, smart glasses, a smart helmet, a smart watch, a smart headphone, a smart wear, a smart backpack, smart accessories, etc., or any combination thereof. In some embodiments, the smart mobile device may include a smart phone, a personal digital assistant (PDA), a gaming device, a navigation device, a point of sale (POS), etc., or any combination thereof. In some embodiments, the virtual reality device and/or the augmented reality device may include a virtual reality helmet, virtual reality glasses, virtual reality goggles, an augmented virtual reality helmet, augmented reality glasses, augmented reality goggles, etc., or any combination thereof.

In some embodiments, the terminal 130 may obtain/receive the voice signal of the target voice, such as the first signal and the second signal. In some embodiments, the terminal 130 may obtain/receive a voice-enhanced output voice signal of the target voice. In some embodiments, the terminal 130 may obtain/receive the voice signal of the target voice, such as the first signal and the second signal, directly from the collection device 120 and the storage device 140, or the terminal 130 may obtain/receive the voice signal of the target voice, such as the first signal and the second signal from the collection device 120 and the storage device through the network 150. In some embodiments, the terminal 130 may directly obtain/receive the voice-enhanced output voice signal of the target voice from the processing device 110 and the storage device 140, or the terminal 130 may obtain/receive the voice-enhanced output voice signal of the target voice from the processing device 110 and the storage device 140 through the network 150.

In some embodiments, the terminal 130 may send instructions to the processing device 110, and the processing device 110 may execute the instructions from the terminal 130. For example, the terminal 130 may send one or more instructions for implementing the method for voice enhancement of the target voice to the processing device 110 such that the processing device 110 may execute one or more operations/processes of the method for voice enhancement.

The storage device 140 may store data and/or information obtained from other devices or system components. For example, the storage device 140 may store the voice signal of the target voice, such as the first signal and the second signal, and store the voice-enhanced output voice signal of the target voice. In some embodiments, the storage device 140 may store data obtained from the collection device 120. In some embodiments, the storage device 140 may store data obtained from processing device 110. In some embodiments, the storage device 140 may store data and/or instructions executed or used by the processing device 110 to perform the exemplary methods described in the present disclosure. In some embodiments, the storage device 140 may include a mass memory, a removable memory, a volatile read-write memory, a read-only memory (ROM), etc., or any combination thereof. Exemplary mass memory may include a magnetic disk, an optical disk, a solid state disk, etc. Exemplary removable memories may include a flash drive, a floppy disk, the optical disk, a memory card, a compact disk, a magnetic tape, etc. Exemplary volatile read-only memories may include a random access memory (RAM). Exemplary RAMs may include a dynamic RAM (DRAM), a double data rate synchronous dynamic RAM (DDR SDRAM), a static RAM (SRAM), a thyristor RAM (T-RAM), and a zero capacitance RAM (Z-RAM), etc. Exemplary ROMs may include a mask ROM (MROM), a programmable ROM (PROM), a programmable erasable ROM (PEROM), an electronically erasable programmable ROM (EEPROM), a compact disc ROM (CD-ROM), and a digital universal disk ROM, etc. In some embodiments, the storage device 140 may be implemented on the cloud platform. Merely by way of example, the cloud platform may include the private cloud, the public cloud, the hybrid cloud, the community cloud, the distributed cloud, the internal cloud, the multi-layer cloud, etc., or any combination thereof.

In some embodiments, the storage device 140 may be connected to the network 150 to communicate with one or more components of the system for voice enhancement 100 (e.g., the processing device 110, the collection device 120, the terminal 130). The one or more components in the system for voice enhancement 100 may access data or instructions stored in the storage device 140 through the network 150. In some embodiments, the storage device 140 may be directly connected or communicated with the one or more components of the system for voice enhancement 100 (e.g., the processing device 110, the collection device 120, and the terminal 130). In some embodiments, the storage device 140 may be a portion of the processing device 110.

In some embodiments, one or more components of the system for voice enhancement 100 (e.g., the processing device 110, the collection device 120, the terminal 130) may have permission to access to the storage device 140. In some embodiments, the one or more components of the system for voice enhancement 100 may read and/or modify information related to the target voice when one or more conditions above are met.

The network 150 may facilitate an exchange of information and/or data. In some embodiments, the one or more components of the system for voice enhancement 100 (e.g., the processing device 110, the collection device 120, the terminal 130, and the storage device 140) may send/receive the data/information to/from other components of the system for voice enhancement 100 through the network 150. For example, the processing device 110 may obtain the first signal and the second signal of the target voice from the collection device 120 or the storage device 140 through the network 150, and the terminal 130 may obtain the voice-enhanced output voice signal of the target voice from the processing device 110 or the storage device 140 through the network 150. In some embodiments, the network 150 may be any form of a wired or wireless network, or any combination thereof. Merely by way of example, the network 150 may include a cable network, a wired network, a fiber optic network, a telecommunications network, an intranet, the Internet, a local area network (LAN), a wide area network (WAN), a wireless local area network (WLAN), a metropolitan area network (MAN), a public switched telephone network (PSTN), a Bluetooth network, a Zigbee network, a near field communication (NFC) network, a global system for mobile communications (GSM) network, a code division multiple access (CDMA) network, a time division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, an ultra-wideband (UWB) network, infrared, etc., or any combination thereof. In some embodiments, the system for voice enhancement 100 may include one or more network access points. For example, the system for voice enhancement 100 may include wired or wireless network access points, such as base stations and/or wireless access points 150-1, 150-2, . . . , through which one or more components of the system for voice enhancement 100 may be connected to the network 150 to exchange data and/or information.

Those skilled in the art may appreciate that when elements or components of the system for voice enhancement 100 are implemented, the components may be implemented by electrical and/or electromagnetic signals. For example, when the collection device 120 sends the first signal and the second signal of the target voice to the processing device 110, the collection device 120 may generate a coded electrical signal. The collection device 120 may then send the electrical signal to an output port. If the collection device 120 communicates with the collection device 120 through the wired network or a data transmission line, the output port may be physically connected to a cable, which further transmits the electrical signal to an input port of the collection device 120. If the collection device 120 communicates with the collection device 120 through the wireless network, the output port of the collection device 120 may be one or more antennas that convert the electrical signal into the electromagnetic signal. In an electronic device, such as the collection device 120 and/or the processing device 110, when processing instructions, issuing instructions and/or performing actions, the instructions and/or actions are performed through the electrical signal. For example, when the processing device 110 retrieves or saves the data from a storage medium (e.g., the storage device 140), the processing device 110 may send the electrical signal to a read/write device of the storage medium. The read/write device may read or write structured data in the storage medium. The structured data may be transmitted to the processor in a form of an electrical signal through a bus of the electronic device. Here, the electrical signal refers to one electrical signal, a series of electrical signal and/or at least two discontinuous electrical signals.

FIG. 2 is a schematic diagram illustrating an exemplary computing device 200 according to some embodiments of the present disclosure. In some embodiments, the processing device 110 may be implemented on the computing device 200. As shown in FIG. 2, the computing device 200 may include a memory 210, a processor 220, an input/output (I/O) 230, and a communication port 240.

The memory 210 may store data/information obtained from the collection device 120, the terminal 130, the storage device 140, or any other component of the system for voice enhancement 100. In some embodiments, the memory 210 may include a mass memory, a removable memory, a volatile read-write memory, a ROM, etc., or any combination thereof. Exemplary mass memories may include a magnetic disk, an optical disk, a solid state disk, etc. Exemplary removable memories may include a flash drive, a floppy disk, the optical disk, a memory card, a compact disk, a magnetic tape, etc. Exemplary volatile read-only memories may include a RAM. Exemplary RAMs may include a DRAM, a DDR SDRAM, an SRAM, a T-RAM, and a Z-RAM, etc. Exemplary ROMs may include an MROM, a PROM, a PEROM, an EEPROM, a CD-ROM, and a digital universal disk ROM, etc. In some embodiments, the memory 210 may store one or more programs and/or instructions to perform the exemplary methods described in the present disclosure. For example, the memory 210 may store the programs executable by the processing device 110 to implement the method for voice enhancement.

The processor 220 may execute a computer instruction (a program code) and perform functions of the processing device 110 according to techniques described in the present disclosure. The computer instruction may include, for example, a routine, a program, an object, a component, a signal, a data structure, a process, a module, and a function, which performs particular functions described herein. For example, the processor 220 may process the data obtained from the collection device 120, the terminal 130, the storage device 140, and/or any other components of the system for voice enhancement 100. For example, the processor 220 may process a first signal and a second signal of a target voice obtained from the collection device 120 to obtain a voice-enhanced output voice signal. In some embodiments, the voice-enhanced output voice signal may be stored in the storage device 140, the memory 210, etc. In some embodiments, the voice-enhanced output voice signal may be output to a broadcasting device such as a speaker through the I/O 230. In some embodiments, the processor 220 may execute the instructions obtained from the terminal 130.

In some embodiments, the processor 220 may include one or more hardware processors, such as a microcontroller, a microprocessor, an RISC, an ASIC, an ASIP, a CPU, a GPU, a PPU, a microcontroller unit, a DSP, an FPGA, an advanced RISC machine (ARM), a PLD, any circuit or processor capable of performing one or more functions, etc., or any combination thereof.

For illustration only, only one processor is described in the computing device 200. It should be noted, however, that the computing device 200 in the present disclosure may further include a plurality of processors. Therefore, operations and/or processes performed by one processor as described in the present disclosure may further be jointly or separately performed by the plurality of processors. For example, if in the present disclosure, the processor of the computing device 200 executes operation A and operation B at the same time, it should be understood that the operation A and the operation B may further be combined or performed respectively by two or more different processors in the computing device. For example, a first processor performs the operation A and a second processor performs the operation B, or the first processor and the second processor perform operations A and B together.

The I/O 230 may input or output signals, data and/or information. In some embodiments, the I/O 230 may enable a user to interact with the processing device 110. In some embodiments, the I/O 230 may include an input device and an output device. Exemplary input devices may include a keyboard, a mouse, a touch screen, a microphone, etc., or combinations thereof. Exemplary output devices may include a display device, a speaker, a printer, a projector, etc., or combinations thereof. Exemplary display devices may include a liquid crystal display (LCD), a light emitting diode (LED) based display, a monitor, a flat panel display, a curved screen, a television device, a cathode ray tube (CRT), etc., or combinations thereof.

The communication port 240 may interface with a network (e.g., the network 150) to facilitate data communication. The communication port 240 may establish a connection between the processing device 110 and the collection device 120, the terminal 130 or the storage device 140. This connection may be a wired connection, a wireless connection, or a combination of both to enable data transmission and reception. The wired connection may include an electrical cable, an optic cable, a telephone line, etc., or any combination thereof. The wireless connection may include a Bluetooth, a Wi-Fi, a WiMax, a WLAN, a ZigBee, a mobile network (e.g., 3G, 4G, 5G, etc.), etc., or combinations thereof. In some embodiments, the communication port 240 may be a standardized communication port, such as RS232, RS485, etc. In some embodiments, the communication port 240 may be a specially designed communication port. For example, the communication port 240 may be designed according to the voice signal to be transmitted.

Figure 3:
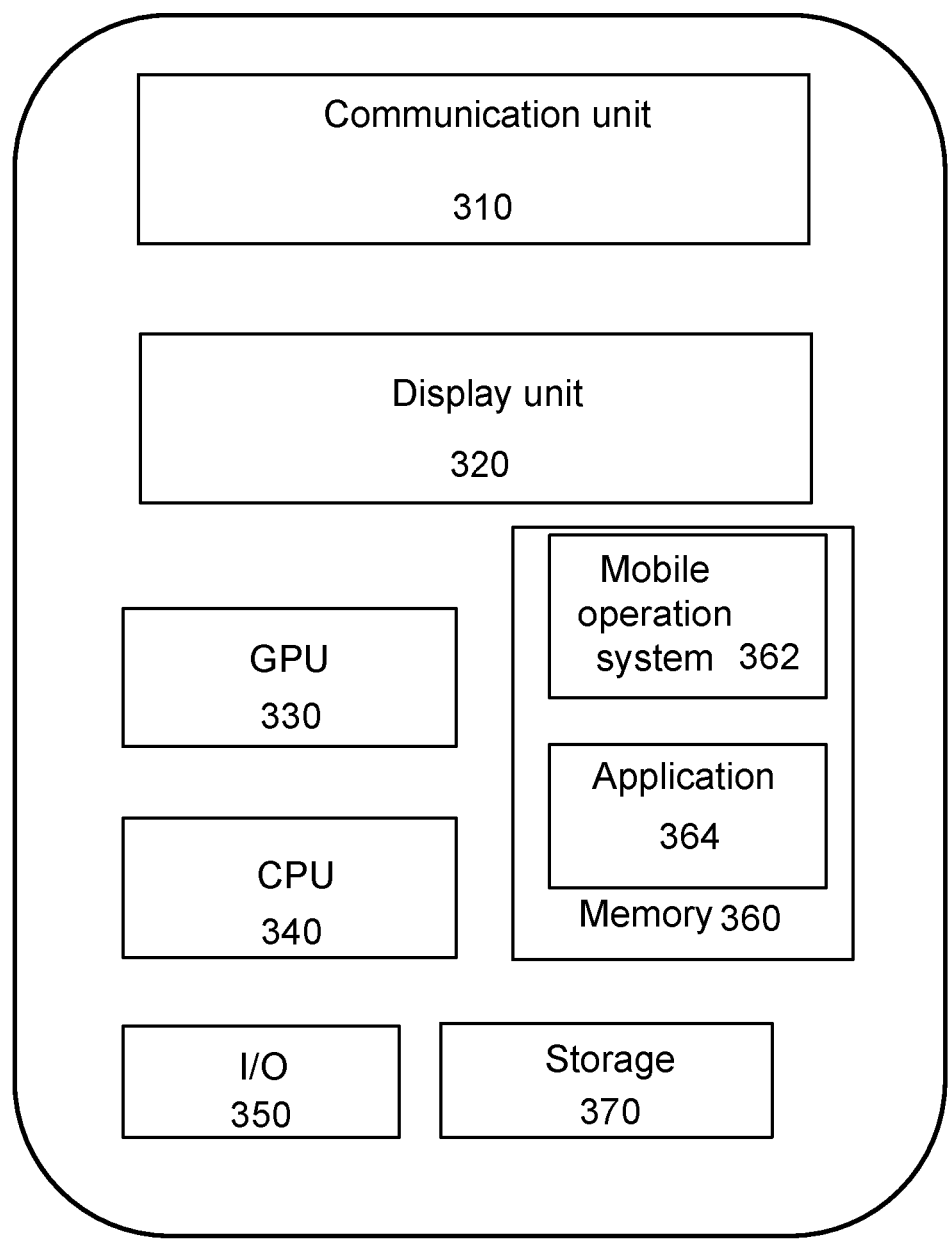
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As shown in FIG. 3, the mobile device 300 may include a communication unit 310, a display unit 320, a GPU 330, a CPU 340, an I/O 350, a memory 360, and a storage 370.

The CPU 340 may include an interface circuit and a processing circuit similar to the processor 220. In some embodiments, any other suitable components, including but not limited to a system bus or a controller (not shown) may also be included in the mobile device 300. In some embodiments, a mobile operation system 362 (e.g., IOS™, Andro™, Windows Phone™, etc.) and one or more application programs 364 may be loaded from the storage 370 into the memory 360 for processing by the CPU 340. The application 364 may include a browser or any other suitable mobile application for receiving and presenting information related to a target voice and a voice enhancement of the target voice from a system for voice enhancement on the mobile device 300. An interaction of signals and/or data may be implemented through the I/O 350 and provided to the processing engine 112 and/or other components of the system for voice enhancement 100 through the network 150.

In order to implement the above-mentioned various modules, units and their functions, a computer hardware platform may be used as a hardware platform for the one or more elements (e.g., modules of the processing device 110 described in FIG. 1). As these hardware elements, operation systems and programming languages are common, it can be assumed that those skilled in the art are familiar with these techniques and that they can provide the information required in a route planning according to the techniques described herein. A computer with a user interface may be used as a personal computer (PC) or other type of workstation or terminal device. When properly programmed, the computer with a user interface may be used as a processing device such as a server. It may be assumed that those skilled in the art may further be familiar with such structure, procedure, or general operation of this type of computer device. Therefore, no additional explanations are described with respect to the drawings.

Figure 4:
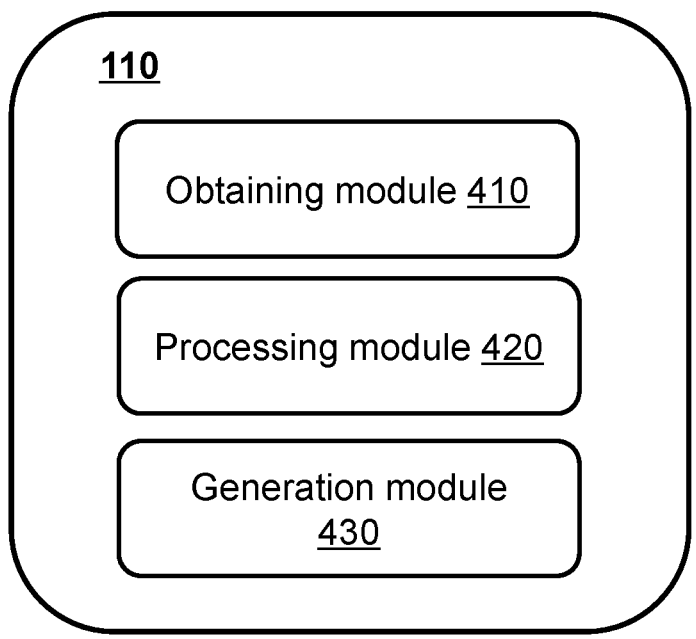
FIG. 4 is a block diagram illustrating an exemplary system for voice enhancement according to some embodiments of the present disclosure.

FIG. 4 is a block diagram illustrating an exemplary system for voice enhancement according to some embodiments of the present disclosure. In some embodiments, the system for voice enhancement 100 may be implemented on the processing device 110. As shown in FIG. 4, the processing device 110 may include an obtaining module 410, a processing module 420, and a generation module 430.

The obtaining module 410 may be configured to obtain a first signal and a second signal of a target voice. In some embodiments, the target voice may include a voice produced by a target sound source. In some embodiments, different collection devices (e.g., different microphones) may be used to collect signals of the target voice at different positions. For example, the first signal may be a signal of the target voice collected by a first microphone (or a front microphone) based on a first position, and the second signal may be a signal of the target voice collected by a second microphone (or a rear microphone) based on a second position. In some embodiments, the obtaining module 410 may directly obtain the first signal and the second signal of the target voice from the different collection devices. In some embodiments, the first signal and the second signal may be stored in a storage device (e.g., the storage device 140, the memory 210, the storage 370, an external storage, etc.). The obtaining module 410 may obtain the first signal and the second signal from the storage device.

The processing module 420 may be configured to determine a first coefficient by processing, based on a position of the target voice, the first position, and the second position, the first signal, and the second signal. In some embodiments, the processing module 420 may be configured to determine the first coefficient based on an adaptive null-forming algorithm. For example, the processing module 420 may be configured to perform a differential operation on the first signal and the second signal based on the position of the target voice, the first position, and the second position, and obtain a signal pointing to a first direction and a signal pointing to a second direction. The signal pointing to the first direction and the signal pointing to the second direction may include different proportions of a valid signal. Further, the processing module 420 may be configured to determine a fourth signal based on the signal pointing to the first direction and the signal pointing to the second direction. For example, the processing module 420 may determine the fourth signal by performing a filtering operation on the signal pointing to the first direction and the signal pointing to the second direction through an adaptive filter based on a Wiener filtering algorithm. In some embodiments, the processing module 420 may enhance a low-frequency component in the fourth signal to obtain a third signal. Further, the processing module 420 may be configured to determine the first coefficient based on the third signal. For example, the processing module 420 may determine a ratio of the third signal to the first signal or a ratio of the third signal to the second signal as the first coefficient. Alternatively or additionally, the processing module 420 may update one or more adaptive parameters of an adaptive differential operation based on the fourth signal, the signal pointing to the first direction, and the signal pointing to the second direction.

In some embodiments, to determine the first coefficient, the processing module 420 may further determine an estimated signal-to-noise ratio (SNR) of the target voice based on the signal pointing to the first direction and the signal pointing to the second direction. For example, the estimated SNR may be a ratio of the signal pointing to a first direction to the signal pointing to the second direction. Further, the processing module 420 may determine the first coefficient based on the estimated SNR.

The processing module 420 may be configured further to determine a plurality of parameters related to a plurality of sound source directions based on the first signal and the second signal. In some embodiments, the plurality of sound source directions may include one or more preset sound source directions. In some embodiments, the processing module 420 may perform a differential operation on the first signal and the second signal based on each sound source direction, the first position, and the second position, and determine one or more parameters related to the each sound source direction. In some embodiments, the plurality of parameters may include a likelihood function. Each parameter of the plurality of parameters may correspond to a probability that a sound is emitted from a sound source direction to form the first signal and the second signal.

The processing module 420 may further be configured to determine a second coefficient based on the plurality of parameters and the position of the target voice. In some embodiments, to determine the second coefficient, the processing module 420 may determine a direction of a synthetic sound source based on the plurality of parameters. The synthetic sound source may be regarded as a virtual sound source formed by a combination of the target sound source and a noise source. For example, the processing module 420 may determine a parameter with the greatest value among the plurality of parameters. The parameter with the greatest value may indicate that a probability that a sound is emitted from a sound source direction corresponding to the parameter with the greatest value to form the first signal and the second signal is the greatest. In such cases, the processing module 420 may determine that the sound source direction corresponding to the parameter with the greatest value is the direction of the synthetic sound source. Further, the processing module 420 may determine the second coefficient based on the direction of the synthetic sound source and the position of the target voice. For example, the processing module 420 may determine whether the position of the target voice is located in the direction of the synthetic sound source, or whether the position of the target voice is within a certain angle range of the direction of the synthetic sound source. In response to determining that the position of the target voice is located in the direction of the synthetic sound source or within the certain angle range of the direction of the synthetic sound source, the second coefficient may be set as a first value. In response to determining that the position of the target voice is not located in the direction of the synthetic sound source or not within the certain angle range of the direction of the synthetic sound source, the second coefficient may be set as the second value. Alternatively or additionally, the processing module 420 may perform a smoothing operation on the second coefficient based on a smoothing factor. As another example, the processing module 420 may determine the second coefficient through a regression function based on an angle between the position of the target voice and the direction of the synthetic sound source.

The generation module 430 may be configured to obtain a voice-enhanced first output voice signal corresponding to the target voice by processing, based on the first coefficient and the second coefficient, the first signal, and/or the second signal. In some embodiments, the generation module 430 may be configured to perform a weighting operation on the first signal and/or the second signal based on the first coefficient and the second coefficient. For example, the generation module 430 may obtain a weighted third signal by assigning, based on a value of the first coefficient, a weight to the third signal obtained based on the first signal and the second signal, and obtain a weighted first signal or a weighted third signal by assign a weight to the first signal or the third signal based on a value of the second coefficient. The generation module 430 may further process the weighted first signal or weighted third signal to obtain the voice-enhanced first output voice signal. For example, the first output voice signal may be an average of the weighted third signal and the weighted first signal. As another example, the first output voice signal may be a product of the weighted third signal and the weighted first signal. As another example, the first output voice signal may be a greater value in the weighted third signal and the weighted first signal. As another example, after weighting the third signal based on the first coefficient, the generation module 430 may further weight the weighted third signal based on the first coefficient.

It should be noted that the above descriptions of the processing device 110 and the modules of the processing device 110 are only for convenience of description, and are not intended to limit the scope of present disclosure. It should be understood that, after understanding the principle of the system, those skilled in the art may combine various modules arbitrarily, or form a subsystem to connect with other modules without departing from this principle. For example, the obtaining module 410 and the processing module 420 disclosed in FIG. 4 may be different modules in one system, or one module that implements functions of the two or more modules. For example, the obtaining module 410 and the processing module 420 may be two modules, or one module that has the functions of obtaining the target voice and processing the target voice. Such deformations are within the protection scope of the present disclosure.

It should be understood that the system and modules shown in FIG. 4 may be implemented in various manners. For example, in some embodiments, the system and the modules of the system may be implemented by hardware, software, or a combination of software and hardware. Among them, the hardware may be implemented by using a special logic. The software may then be stored in the memory and executed by a suitable instruction execution system, such as a microprocessor or specially designed hardware. Those skilled in the art may appreciate that the methods and systems described above may be implemented using computer-executable instructions and/or contained in a processor control code, for example, on a carrier medium such as a magnetic disk, a CD, or a DVD-ROM, such as a read-only memory (firmware) or on a data carrier such as an optical or electronic signal carrier. The system and the modules of the system in the present disclosure may not only be implemented by hardware circuits such as very large scale integrated circuits (VLSI) or gate arrays, semiconductors such as logic chips, transistors, etc., or programmable hardware devices such as field programmable gate arrays (FPGA), programmable logic devices (PLD), etc., the system and the modules of the system in the present disclosure may further be implemented by software executed by various types of processors, and may further be implemented by a combination of the above hardware circuits and software (e.g., firmware).

Figure 5:
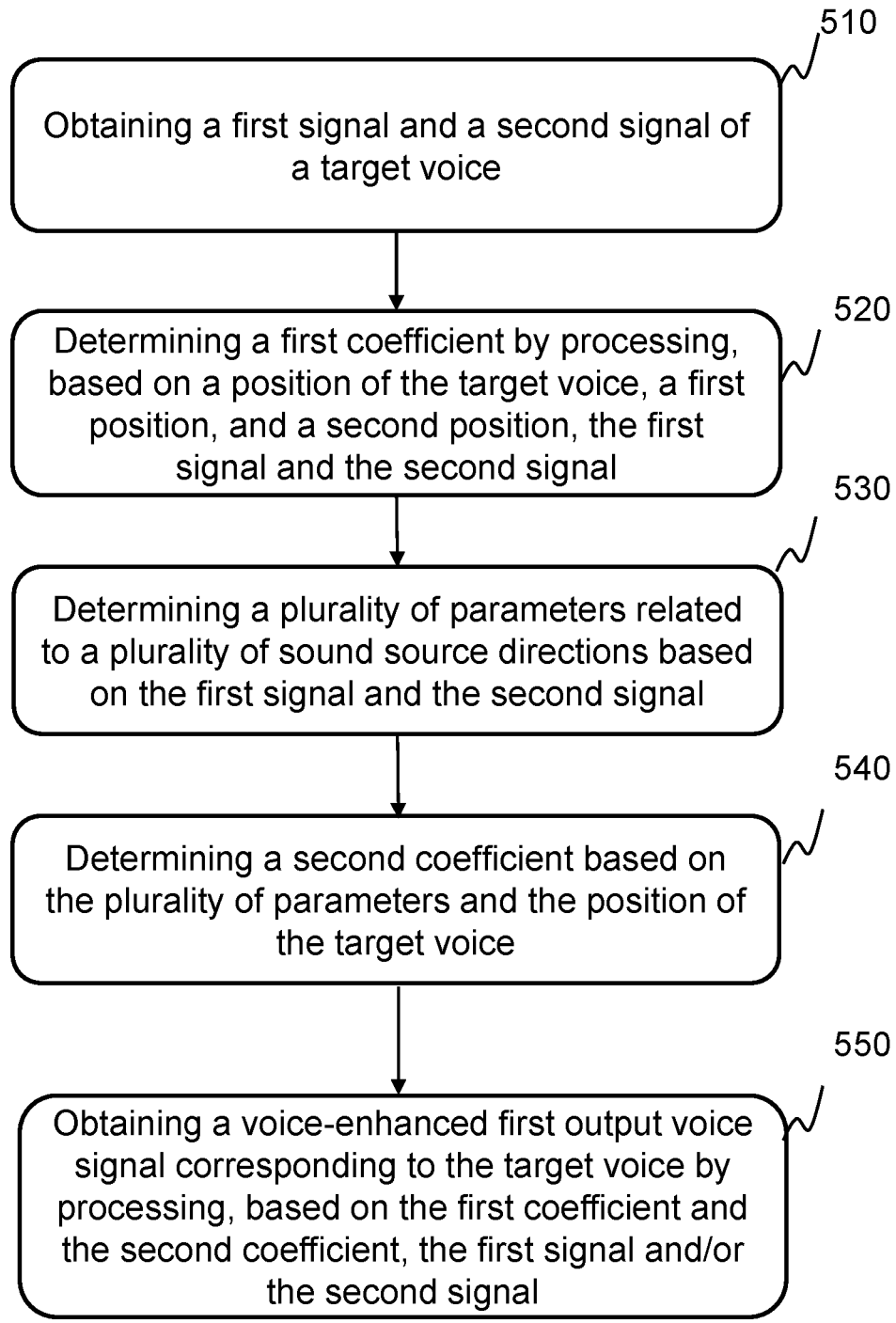
FIG. 5 is a flowchart illustrating an exemplary process for voice enhancement according to some embodiments of the present disclosure.

FIG. 5 is a flowchart illustrating an exemplary process for voice enhancement according to some embodiments of the present disclosure. In some embodiments, a method 500 may be executed by the processing device 110, the processing engine 112, or the processor 220. For example, the method 500 may be stored in a storage device (e.g., the storage device 140 or a storage unit of the processing device 110) in a form of a program or instructions, when the processing device 110, the processing engine 112, the processor 220 or the modules shown in FIG. 4 execute the program or the instructions, the method 500 may be implemented. In some embodiments, the method 500 may be accomplished with one or more additional operations/processes not described below, and/or without one or more operations/processes discussed below. Additionally, a sequence of operations/processes shown in FIG. 5 is not limiting.

In 510, the processing device 110 (e.g., the obtaining module 410) may obtain a first signal and a second signal of a target voice.

In some embodiments, the target voice may include a voice produced by a target sound source. The target sound source may be a user, a robot (e.g., an automatic answering robot, a robot that converts human input data such as texts, gestures, etc. into a voice signal, etc.), or other creatures and devices that can generate voice information. In some embodiments, the voice from the target sound source may be used as a valid signal. In some embodiments, the target voice may include a useless or disturbing noise signal, for example, a noise generated by the surrounding environment or a sound from other sound sources other than the target sound source. Exemplary noises may include an additive noise, a white noise, a multiplicative noise, etc., or any combination thereof. The additive noise refers to a noise signal independent of the voice signal. The multiplicative noise refers to a noise signal proportional to the voice signal. The white noise refers to a noise signal whose power spectrum is constant. In some embodiments, when the target voice includes the noise signals, the target voice may be a synthetic signal of the valid signal and the noise signal. The synthetic signal may be equivalent to a voice signal generated by a synthetic sound source of the target sound source and a noise sound source.

Figure 6:
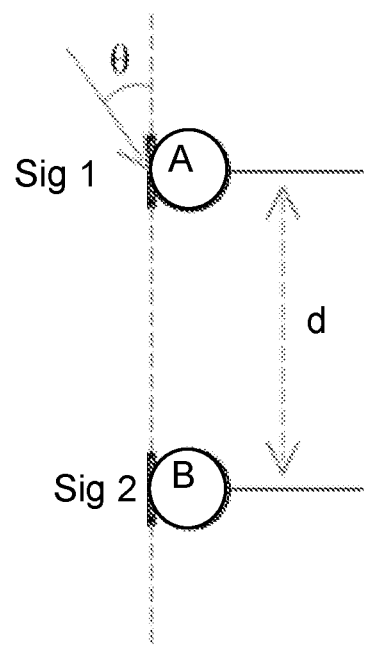
FIG. 6 is a schematic diagram illustrating exemplary dual microphones according to some embodiments of the present disclosure.

In some embodiments, different collection devices (e.g., different microphones) may be used to collect signals of the target voice at different positions. Taking dual microphones as an example, FIG. 6 is a schematic diagram illustrating exemplary dual microphones according to some embodiments of the present disclosure. As shown in FIG. 6, a target sound source (such as a user's mouth) is located on the upper left of the dual microphones, and an angle between a line connecting the dual microphones and a direction of the target sound source pointing to the dual microphones (e.g., a direction of the target sound source pointing to a first microphone A) is θ. A first signal Sig1 may be a signal of the target voice collected by the first microphone A (or a front microphone) based on a first position, and a second signal Sig2 may be a signal of the target voice collected by a second microphone B (or a rear microphone) based on a second position. Merely by way of example, the first position and the second position may be two positions with a distance d. Meanwhile, the first position and the second position may have different distances from the target sound source (such as the user's mouth). d may be set according to actual needs, for example, in a specific scene, d may be set to be no less than 0.5 cm, or no less than 1 cm. In some embodiments, the first signal or the second signal may include an electrical signal generated by a collection device after receiving the target voice (or an electrical signal generated after further processing). The first signal or the second signal may reflect position information of the target voice relative to the collection device. In some embodiments, the first signal and the second signal may be representations of the target voice in a time domain. For example, the processing device 110 may frame signals obtained by the first microphone A and the second microphone B to obtain the first signal and the second signal, respectively. Taking the obtaining of the first signal as an example, the processing device 110 may divide a signal obtained by the first microphone into a plurality of segments in the time domain (e.g., equally or overlappingly divided into a plurality of segments each of which having a duration of 10-30 ms), each segment may be used as a frame signal, and the first signal may include one or more frame signals. In some embodiments, the first signal and the second signal may be representations of the target voice in a frequency domain. For example, the processing device 110 may perform a Fast Fourier Transform (FFT) operation on the one or more frame signals to obtain the first signal or the second signal. Optionally, before performing the FFT operation on the one or more frame signals, a windowed smoothing operation may be performed on at least one frame signal. Specifically, the processing device 110 may multiply the frame signal by a window function to perform a period expansion on the frame signal and obtain a periodic continuous signal. Exemplary window functions may include a rectangular window, a Hanning window, a flat top window, an exponential window, etc. Further, the FFT operation may be performed on the frame signal after the windowed smoothing operation such that the first signal or the second signal may be generated.

In some embodiments, a difference between the first signal and the second signal may be related to a difference between intensities, signal amplitudes, phases, etc. of the target voice and the noise signal at different positions.

In 520, the processing device 110 (e.g., the processing module 420) may determine a first coefficient by processing, based on a position of the target voice, the first position, and the second position, the first signal and the second signal.

In some embodiments, the processing device 110 may determine the first coefficient based on an ANF algorithm. The ANF algorithm may include two differential beamformers and an adaptive filter. In some embodiments, the processing device 110 may obtain a signal pointing to the first direction and a signal pointing to the second direction by performing, based on the position of the target voice, the first position, and the second position, a differential operation on the first signal and the second signal through the two differential beamformers. For example, the processing device 110 may perform a time-delay operation on the first signal and the second signal based on the position of the target voice, the first position, and the second position according to a differential microphone principle. A differential operation may be performed on the first signal and the second signal after the time-delay operation to obtain the signal pointing to the first direction and the signal pointing to the second direction. In some embodiments, the signal pointing to the first direction may be a signal pointing to the direction of the target sound source, and the signal pointing to the second direction may be a signal pointing to a direction opposite to the target sound source. The signal pointing to the first direction and the signal pointing to the second direction may include different proportions of a valid signal. The valid signal refers to a voice generated by the target sound source. For example, the signal pointing to the first direction may include a greater proportion of the valid signal (and/or a smaller proportion of the noise signal). The signal pointing to the second direction may include a smaller proportion of the valid signal (and/or a greater proportion of the noise signal). In some embodiments, the signal pointing to the first direction and the signal pointing to the second direction may correspond to two directional microphones. Further, the processing device 110 may determine a third signal corresponding to the valid signal based on the signal pointing to the first direction and the signal pointing to the second direction. For example, the processing device 110 may determine a fourth signal by performing an adaptive differential operation on the signal pointing to the first direction and the signal pointing to the second direction. Merely by way of example, in the adaptive differential operation, the processing device 110 may determine the fourth signal by performing, based on the Wiener filter algorithm, a filtering operation on the signal pointing to the first direction and the signal pointing to the second direction through the adaptive filter. In some embodiments, in the adaptive differential operation, the processing device 110 may adjust parameters of the adaptive filter so that a zero point of a cardioid shape corresponding to the fourth signal points to a noise source direction. In some embodiments, the processing device 110 may enhance a low-frequency component in the fourth signal to obtain the third signal. Further, the processing device 110 may determine the first coefficient based on the third signal. For example, the first coefficient may be a ratio of the third signal to the first signal or a ratio of the third signal to the second signal. More descriptions regarding determining the first coefficient based on the third signal may be found elsewhere in the present disclosure. See, e.g., FIG. 8 and relevant descriptions thereof.

In some embodiments, to determine the first coefficient, the processing device 110 may determine an estimated SNR of the target voice based on the signal pointing to the first direction and the signal pointing to the second direction. For example, the estimated SNR may be a ratio of the signal pointing to the first direction to the signal pointing to the second direction. Further, the processing device 110 may determine the first coefficient based on the estimated SNR. In some embodiments, the processing device 110 may determine the first coefficient based on a mapping relationship between the estimated SNR and the first coefficient. The mapping relationship may be in various forms, for example, a mapping relationship database or a relational function. More descriptions regarding determining the first coefficient based on the estimated SNR may be found elsewhere in the present disclosure. See, e.g., FIG. 9 and relevant descriptions thereof.

In some embodiments, the first coefficient may reflect an influence of the noise signal on the valid signal. Taking the first coefficient determined based on the estimated SNR as an example, the estimated SNR may be the ratio of the signal pointing to the first direction to the signal pointing to the second direction. The signal pointing to the first direction may include a greater proportion of the valid signal (and/or a smaller proportion of the noise signal). The signal pointing to the second direction may include a smaller proportion of the valid signal (and/or a greater proportion of the noise signal). In such cases, a magnitude of the noise signal may affect a value of the estimated SNR and thus affect the value of the first coefficient. For example, the greater the noise signal, the smaller the value of the estimated SNR, and the value of the first coefficient determined based on the estimated SNR may change accordingly. Therefore, the first coefficient may reflect an influence of the noise signal on the valid signal.

In some embodiments, the first coefficient may be related to a noise source direction. For example, when the noise source direction is close to the target sound source direction, the first coefficient may have a greater value; when the noise source direction deviates from the target sound source direction by a greater angle, the first coefficient may have a smaller value. The noise source direction is a direction of the noise source relative to the dual microphones, and the target sound source direction is a direction of the target sound source (such as the user's mouth) relative to the dual microphones. The processing device 110 may process the third signal corresponding to the valid signal based on the first coefficient. For example, the first coefficient may indicate a weight of the third signal corresponding to the valid signal in a voice enhancement process. Merely by way of example, when the first coefficient is "1", it means that the third signal may be completely reserved as a portion of an enhanced voice signal; when the first coefficient is "0", it means that the third signal may be completely filtered out from the enhanced voice signal.

In some embodiments, when an angle difference between the noise source direction and the target sound source direction is relatively great, the first coefficient may have a smaller value, and the third signal processed based on the first coefficient may be weakened or removed. When the angle difference between the noise source direction and the target sound source direction is relatively small, the first coefficient may have a greater value, and the third signal processed based on the first coefficient may be retained as a portion of the enhanced voice signal. In such cases, when the angle difference between the noise source direction and the target sound source direction is great, the ANF algorithm may have a better filtering effect. FIG. 7 is a schematic diagram illustrating a filtering effect of an adaptive null-forming (ANF) algorithm at different noise angles according to some embodiments of the present disclosure. The noise angle refers to an angle between a noise source direction and a target sound source direction. As shown in FIG. 7, figures a-f represent the filtering effects of the ANF algorithm when the noise angles are 180°, 150°, 120°, 90°, 60°, and 30°, respectively. According to FIG. 7, when the noise angle is relatively great (e.g., 180°, 150°, 120°, 90°), the filtering effect of the ANF algorithm is better. When the noise angle is relatively small (e.g., 60°, 30°), the filtering effect of the ANF algorithm is poor.

In 530, the processing device 110 (e.g., the processing module 420) may determine a plurality of parameters related to a plurality of sound source directions based on the first signal and the second signal.

In some embodiments, the plurality of sound source directions may include one or more preset sound source directions. For example, the plurality of sound source directions may have preset incident angles (e.g., 0°, 30°, 60°, 90°, 120°, 180°, etc.). The sound source direction may be selected and/or adjusted according to actual needs, which is not limited here. In some embodiments, the processing device 110 may determine one or more parameters related to each sound source direction by performing, based on the each sound source direction, the first position, and the second position, a differential operation on the first signal and the second signal. For example, each sound source direction in the plurality of sound source directions may correspond to a time delay, and the processing device 110 may perform a differential operation on the first signal and the second signal based on the time delay. Further, the processing device 110 may determine the one or more parameters related to the sound source direction based on the differential operation. In some embodiments, the one or more parameters may include a likelihood function. For example, for each signal point of a current frame, the processing device 110 may determine a likelihood function corresponding to each sound source direction in the plurality of sound source directions. In some embodiments, the likelihood function may correspond to a probability that a sound is emitted from the sound source direction to form the first signal and the second signal. Merely by way of example, a value of the likelihood function when the sound source direction is θ=30° is 0.8 after a normalization, which indicates that the probability that a sound is emitted from the sound source direction of θ=30° to form the first signal and the second signal is 80%.

In 540, the processing device 110 (e.g., the processing module 420) may determine, based on the plurality of parameters and the position of the target voice, a second coefficient.

In some embodiments, the processing device 110 may determine a direction of a synthetic sound source based on the plurality of parameters. The synthetic sound source may be regarded as a virtual sound source synthesized by the target sound source and the noise source. That is, the signals (e.g., the first signal and the second signal) jointly generated by the target sound source and the noise source at the dual microphones may be equivalent to signals generated by the synthetic sound source at the dual microphones.

In some embodiments, to determine the direction of the synthetic sound source, the processing device 110 may determine a parameter with the greatest value among the plurality of parameters. The parameter with the greatest value may indicate that a probability that a sound is emitted from a sound source direction corresponding to the parameter with the greatest value to form the first signal and the second signal is the greatest. In such cases, the processing device 110 may determine that the sound source direction corresponding to the parameter with the greatest value is the direction of the synthetic sound source. As another example, to determine the direction of the synthetic sound source, the processing device 110 may construct a plurality of directional microphones whose poles point to the plurality of sound directions, respectively. A response of each of the plurality of directional microphones may have a cardioid shape. For the convenience of description, the cardioid shape corresponding to the each of the plurality of sound source directions may be referred to as a simulated cardioid shape. The pole of each simulated cardioid shape may point to the corresponding sound source direction. Further, based on the first signal and the second signal, the processing device 110 may determine the likelihood function corresponding to each sound source direction in the plurality of sound source directions. A response of the likelihood function corresponding to the each sound source direction may have a cardioid shape. For the convenience of description, the cardioid shape corresponding to the likelihood function may be referred to as a synthetic cardioid shape (or an actual cardioid shape). The pole of the synthetic cardioid shape points to the direction of the synthetic sound source. The processing device 110 may determine a simulated cardioid shape that is closest to the pole of the actual cardioid shape, and determine the sound source direction corresponding to the simulated cardioid shape as the direction of the synthetic sound source.

In some embodiments, the processing device 110 may determine the second coefficient based on the direction of the synthetic sound source and the position of the target voice. For example, the processing device 110 may determine whether the position of the target voice is located in the direction of the synthetic sound source, or whether the position of the target voice is within a certain angle range of the direction of the synthetic sound source. In response to determining that the position of the target voice is located in the direction of the synthetic sound source or within a certain angle range of the direction of the synthetic sound source, the second coefficient may be set as a first value. In response to determining that the position of the target voice is not located in the direction of the synthetic sound source or not within a certain angle of the direction of the synthetic sound source, the second coefficient may be set as a second value. Alternatively or additionally, the processing device 110 may perform a smoothing operation on the second coefficient based on a smoothing factor. As another example, the processing device 110 may determine, based on an angle between the position of the target voice and the direction of the synthetic sound source, the second coefficient using a regression function. More descriptions regarding determining the second coefficient may be found elsewhere in the present disclosure. See, e.g., FIG. 10 and relevant descriptions thereof.

In some embodiments, the second coefficient may reflect the direction of the synthetic sound source relative to the target sound source, which may be used to weaken or remove the synthetic sound sources that are not in the direction of the target sound source and/or the synthetic sound sources that are offset by an angle relative to the direction of the target sound source. In some embodiments, the second coefficient may be used to filter out noise whose angle difference between the direction of the noise source and the direction of the target sound source exceeds a certain threshold. For example, when the angle difference between the direction of the noise source and the direction of the target sound source exceeds a certain threshold, the second coefficient may have a relatively small value. When the angle difference between the direction of the noise source and the direction of the target sound source is smaller than a certain threshold, the second coefficient may have a relatively great value. The processing device 110 may process the first signal or the third signal based on the second coefficient. For example, the second coefficient may represent a weight of the first signal in the voice enhancement process. Merely by way of example, when the second coefficient is "1", it means that the first signal may be completely reserved as a portion of the enhanced voice signal; when the second coefficient is "0", it means that the first signal may be completely filtered out from the enhanced voice signal.

In 550, the processing device 110 (e.g., the generation module 430) may obtain a voice-enhanced first output voice signal corresponding to the target voice by processing, based on the first coefficient and the second coefficient, the first signal, and/or the second signal.

In some embodiments, the processing device 110 may perform a weighting operation on the first signal and/or the second signal based on the first coefficient and the second coefficient. Taking the first coefficient as an example, the processing device 110 may obtain a weighted third signal by assigning, based on the value of the first coefficient, a weight to the third signal obtained based on the first signal and the second signal. For example, the processing device 110 may assign the weight to the third signal based on a range of the first coefficient. As another example, the processing device 110 may directly use the value of the first coefficient as the weight of the third signal. As another example, when the value of the first coefficient is smaller than a first coefficient threshold, the processing device 110 may set the weight of the third signal as 0. Taking the second coefficient as an example, the processing device 110 may obtain a weighted first signal or a weighted third signal by assigning, based on the value of the second coefficient, a weight to the first signal or the third signal. The processing device 110 may further process the weighted first signal and/or the weighted third signal to obtain the voice-enhanced first output voice signal. For example, the first output voice signal may be an average of the weighted third signal and the weighted first signal. As another example, the first output voice signal may be a product of the weighted third signal and the weighted first signal. As another example, the first output voice signal may be a greater value in the weighted third signal and the weighted first signal. As another example, the generation module 430 may obtain a weighted third signal based on the first coefficient, and then perform a weighting operation on the weighted third signal based on the second coefficient.

It should be noted that the above description of the method for voice enhancement 500 is only for the convenience of description, and does not limit the scope of the present disclosure. It should be understood that, after understanding the principle of the method, those skilled in the art may make any combination of various operations, or may add or delete any operations without departing from the principle.

In some embodiments, the method 500 may further include a single-mic filtering process. For example, the processing device 110 may perform a single-mic filtering operation on the first output voice signal based on a single-mic filtering algorithm. As another example, the processing device 110 may process the first signal and/or the second signal based on the single-mic filter algorithm to obtain the third coefficient, and perform a filtering operation on the first output voice signal based on the third coefficient. More descriptions regarding the single-mic filtering process may be found elsewhere in the present disclosure. See, e.g., FIG. 11, FIG. 12, and the relevant descriptions thereof.

In some embodiments, the processing device 110 may further perform the voice enhancement processing based on a fourth coefficient. For example, the processing device 110 may determine the fourth coefficient based on a power level difference between the first signal and the second signal. Based on any one or a combination of the first coefficient, the second coefficient, and the fourth coefficient, the processing device 110 may obtain the voice-enhanced output voice signal by processing the first signal and/or the second signal. More descriptions regarding the voice enhancement based on the fourth coefficient may be found elsewhere in the present disclosure. See, e.g., FIG. 13 and relevant descriptions thereof.

In some embodiments, the above method 500 for voice enhancement may be implemented on the first signal and/or the second signal obtained after a preprocessing operation (e.g., a framing operation, a windowing and smoothing operation, an FFT operation, etc.). That is, the first output voice signal may be a single-frame voice signal. Thus, the method 500 may further include a post-processing operation. Exemplary post-processing operations may include an inverse FFT transform, a frame stitching, etc. After the post-processing operation, the processing device 110 may obtain continuous output voice signals.

FIG. 8 is a flowchart illustrating an exemplary process for determining a first coefficient according to some embodiments of the present disclosure. In some embodiments, the method 800 may be executed by the processing device 110, the processing engine 112, or the processor 220. For example, the method 800 may be stored in a storage device (e.g., the storage device 140 or a storage unit of the processing device 110) in a form of a program or instructions, when the processing device 110, the processing engine 112, the processor 220, or the modules shown in FIG. 4 execute the program or the instructions, a method 800 may be implemented. In some embodiments, the operation 520 described in method 500 may be implemented through the method 800. In some embodiments, the method 800 may be accomplished with one or more additional operations/processes not described below, and/or without one or more operations/processes discussed below. Additionally, an order of the operations/processes shown in FIG. 8 is not limiting.

In some embodiments, the processing device 110 may determine the first coefficient based on the ANF algorithm. The ANF algorithm may include two differential beamformers and an adaptive filter. The two differential beamformers may perform a differential operation on the first signal and the second signal to obtain a signal pointing to a first direction and a signal pointing to a second direction. The adaptive filter may perform an adaptive filtering operation on the signal pointing to the first direction and the signal pointing to the second direction to obtain a third signal corresponding to a valid signal. As shown in FIG. 8, the method 800 may include the following operations.

In 810, the processing device 110 may obtain a signal pointing to a first direction and a signal pointing to a second direction by performing, based on the position of the target voice, the first position, and the second position, a differential operation on the first signal and the second signal.

In some embodiments, the processing device 110 may perform a time-delay operation on the first signal and the second signal based on the position of the target voice, the first position, and the second position according to a differential microphone principle. For example, as shown in FIG. 6, a distance between the front microphone A and the rear microphone B is d, and the target sound source has an incident angle θ, then a propagation time of a target sound source between the front microphone A and the rear microphone B may be expressed as:

$$\tau = d \cos \theta / c, \quad (1)$$

where c denotes a propagation speed of sound. The propagation time τ may serve as a time delay between the first signal and the second signal. When $\theta=0°$, $\tau=d/c$. According to the differential microphone principle, the signal pointing to the first direction and the signal pointing to the second direction may be obtained and expressed as:

$$x_s(t) = sig1(t) - sig2(t-\tau), \quad (2)$$

$$x_n(t) = sig2(t) - sig1(t-\tau), \quad (3)$$

where t denotes each time point of a current frame, sig1 denotes the first signal, and sig2 denotes the second signal.

According to the above Equations (2) and (3), the first signal sig1 and the second signal sig2 are respectively time-delayed based on the time delay τ and then differentiated to obtain the signal $x_s$ pointing to the first direction and the signal $x_n$ pointing to the second direction. The signal $x_s$ pointing to the first direction may correspond to a first directional microphone, a response of the first directional microphone may have a cardioid shape, a pole of the cardioid shape points to the target sound source direction. The signal $x_n$ pointing to the second direction may correspond to a second directional microphone, a response of the second directional microphone may have a cardioid shape, and a zero point of the cardioid shape points to the target sound source direction.

In some embodiments, the signal $x_s$ pointing to the first direction and the signal $x_n$ pointing to the second direction may contain different proportions of a valid signal. For example, the signal $x_s$ pointing to the first direction may contain a greater proportion of the valid signal (and/or a smaller proportion of noise signal). The signal $x_n$ pointing to the second direction may contain a smaller proportion of the valid signal (and/or a greater proportion of the noise signal).

In 820, the processing device 110 may determine a fourth signal by performing an adaptive differential operation on the signal pointing to the first direction and the signal pointing to the second direction.

In some embodiments, the processing device 110 may perform a filtering operation on the signal pointing to the first direction and the signal pointing to the second direction through the adaptive filter based on a Wiener filtering algorithm. The adaptive filter may be a least mean square (LMS) filter. In the filtering operation, the signal $x_s$ pointing to the first direction may be used as a desired signal of the LMS filter, and the signal $x_n$ pointing to the second direction may be used as a reference noise of the LMS filter. Based on the desired signal and the reference noise, the processing device 110 may perform the adaptive differential filtering (that is, the adaptive differential operation) on the signal $x_s$ pointing to the first direction and the signal $x_n$ pointing to the second direction through the LMS filter, and determine the fourth signal. The fourth signal may be a signal after noise filtering. In some embodiments, an exemplary process of the adaptive differential operation may be shown in the following Equation:

$$y = x_s - w x_n, \quad (4)$$

where y denotes the fourth signal (that is, an output signal of the LMS filter), and w denotes an adaptive parameter of the adaptive differential operation (that is, a coefficient of the LMS filter).

In some embodiments, in the adaptive differential operation, the processing device 110 may update the adaptive parameter w of the adaptive differential operation based on the fourth signal y, the signal $x_s$ pointing to the first direction, and the signal $x_n$ pointing to the second direction. For example, based on each frame of first signal and second signal, the processing device 110 may obtain the signal $x_s$ pointing to the first direction and the signal $x_n$ pointing to the second direction. Further, the processing device 110 may update the adaptive parameter w based on a gradient descent algorithm such that a loss function (e.g., a mean square error loss function) of the adaptive differential operation may gradually converge.

In 830, the processing device 110 may obtain the third signal by enhancing a low-frequency component in the fourth signal.

In some embodiments, the differential beamformer may have a high-pass filtering property. When the differential beamformer is used to perform the differential operation on the first signal and the second signal, the low-frequency component in the first signal and the second signal may be weakened. Correspondingly, the low-frequency component in the fourth signal y obtained after the adaptive differential operation is weakened. In some embodiments, the processing device 110 may enhance the low-frequency component in the fourth signal y through a compensation filter. Merely by way of example, the compensation filter may be shown in the following Equation:

$$W_{EQ} = \begin{cases} \dfrac{1}{\sin\left(\dfrac{\pi \omega}{2\omega_c}\right)}, & 0 < \omega < \omega_c \\ 1, & \text{otherwise} \end{cases} \quad (5)$$

where $W_{EQ}$ denotes the compensation filter, ω denotes the frequency of the fourth signal y, and $\omega_c$ denotes a cutoff frequency of the high-pass filtering. In some embodiments, an exemplary value of $\omega_c$ may be:

$$\omega_c = 0.5\pi c/d, \quad (6)$$

where c denotes a propagation speed of sound, d denotes a distance between the dual microphones.

In some embodiments, the processing device 110 may obtain the third signal by performing, based on the compensation filter $W_{EQ}$, a filtering operation on the fourth signal y. For example, the third signal may be a product of the fourth signal y and the compensating filter $W_{EQ}$.

In 840, the processing device 110 may determine the first coefficient based on the third signal.

In some embodiments, the processing device 110 may determine a ratio of the third signal to the first signal or a ratio of the third signal to the second signal, and determine the first coefficient according to the ratio.

It should be noted that the above description of the method 800 is only for the convenience of description, and does not limit the scope of the present disclosure. It should be understood that, after understanding the principle of the method, those skilled in the art may make any combination of various operations, or may add or delete any operations without departing from this principle.

For illustration only, the operation of the method 800 in the above embodiments is to process the first signal and the second signal in a time domain. It should be understood that the one or more operations in method 800 may further be performed in a frequency domain. For example, the time-delay operation performed on the first signal and the second signal in the time domain may also be an equivalent phase shifting performed on the first signal and the second signal in the frequency domain. In some embodiments, operation 830 is not necessary, that is, the fourth signal obtained in operation 820 may be directly used as the third signal without enhancing the low-frequency component.

Figure 9:
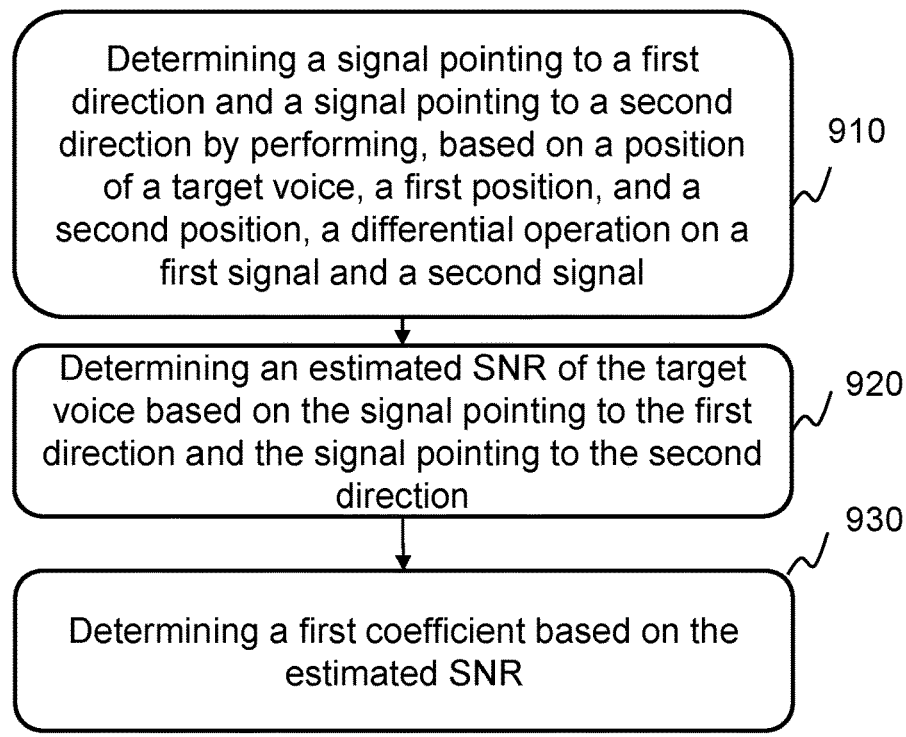
FIG. 9 is a flowchart illustrating an exemplary process for determining a first coefficient according to some embodiments of the present disclosure.

FIG. 9 is a flowchart illustrating an exemplary process for determining a first coefficient according to some embodiments of the present disclosure. In some embodiments, a method 900 may be executed by the processing device 110, the processing engine 112, or the processor 220. For example, the method 900 may be stored in a storage device (e.g., the storage device 140 or a storage unit of the processing device 110) in a form of a program or instructions, when the processing device 110, the processing engine 112, the processor 220, or the modules shown in FIG. 4 execute the program or the instructions, the method 900 may be implemented. In some embodiments, operation 520 described in the method 500 may be implemented by the method 900. In some embodiments, the method 900 may be accomplished with one or more additional operations/processes not described below, and/or without one or more operations/processes discussed below. Additionally, the sequence of operations/processes shown in FIG. 9 is not limiting. As shown in FIG. 9, the method 900 may include the following operations.

In 910, the processing device 110 may determine a signal pointing to a first direction and a signal pointing to a second direction by performing, based on a position of a target voice, a first position, and a second position, a differential operation on a first signal and a second signal. The signal pointing to the first direction and the signal pointing to the second direction may contain different proportions of a valid signal.

In some embodiments, operation 910 may be performed according to operation 810 described in FIG. 8, which is not repeated here.

In 920, the processing device 110 may determine an estimated SNR of the target voice based on the signal pointing to the first direction and the signal pointing to the second direction.

In some embodiments, the signal pointing to the first direction may contain a greater proportion of the valid signal (and/or a smaller proportion of a noise signal). The signal pointing to the second direction may contain a smaller proportion of the valid signal (and/or a greater proportion of the noise signal). The estimated SNR may be expressed as a ratio (i.e., $x_s/x_n$) between the signal pointing to the first direction and the signal pointing to the second direction. In some embodiments, different estimated SNRs may correspond to different incident angles θ of a synthetic sound source. For example, a great estimated SNR may correspond to a small incident angle θ of the synthetic sound source. In some embodiments, the incident angle θ of the synthetic sound source may reflect an influence of the noise signal on the valid signal. For example, when the noise signal has a relatively great influence on the valid signal (e.g., an angle difference between the noise source direction and the target sound source direction is relatively great), the incident angle θ of the synthetic sound source may have a relatively great value; when the noise signal has a relatively small influence on the valid signal (e.g., the angle difference between the noise source direction and the target sound source direction is relatively small), the incident angle θ of the synthetic sound source may have a relatively small value. In such cases, the estimated SNR may reflect the direction of the synthetic sound source, and further reflect the influence of the noise signal on the valid signal.

In 930, the processing device 110 may determine the first coefficient based on the estimated SNR.

In some embodiments, the processing device 110 may determine the first coefficient based on a mapping relationship between the estimated SNR and the first coefficient. The mapping relationship may be in various forms, for example, a mapping relationship database or a relational function.

In some embodiments, different noise source directions may correspond to different incident angles θ of the synthetic sound source, and correspondingly may correspond to different estimated SNRs. That is, the estimated SNR may be related to the direction of the noise source (that is, related to an influence degree of the noise signal on the valid signal). Thus, for different estimated SNRs, different first coefficients may be determined. For example, when the estimated SNR is small, the corresponding incident angle θ of the synthetic sound source may have a relatively great value, indicating that the noise signal has a relatively great influence on the valid signal. Correspondingly, the third signal corresponding to the valid signal may contain a relatively great proportion of noise signal. In such cases, the third signal may be weakened or removed by determining the value of the first coefficient. The processing device 110 may process the third signal corresponding to the valid signal based on the first coefficient. For example, the first coefficient may indicate a weight of the third signal corresponding to the valid signal in a voice enhancement operation. Merely by way of example, when the first coefficient is "1", it indicates that the third signal may be completely reserved as a portion of an enhanced voice signal; when the first coefficient is "0", it indicates that the third signal may be completely filtered out from the enhanced voice signal. In some embodiments, the mapping relationship database between the estimated SNR and the first coefficient may be established. The processing device 110 may determine the first coefficient by searching the database based on the estimated SNR.

In some embodiments, the processing device 110 may further determine the first coefficient based on the relationship function between the estimated SNR and the first coefficient. For example, the relational function may be represented as the following Equation:

$$\begin{cases} 0.5*\left(\frac{x_s}{x_n}\right)^2, \frac{x_s}{x_n} \le 1 \\ 1-0.5*\left(\frac{x_s}{x_n}-2\right)^2, 1 < \frac{x_s}{x_n} \le 2, \\ 1, \frac{x_s}{x_n} > 2 \end{cases} \quad (7)$$

where $x_s/x_n$ denotes the estimated SNR.

It should be noted that the above description of the method 900 is only for convenience of description, and does not limit the scope of the present disclosure. It should be understood that, after understanding the principle of the method, those skilled in the art may make any combination of various operations, or may add or delete any operations without departing from this principle.

Figure 10:
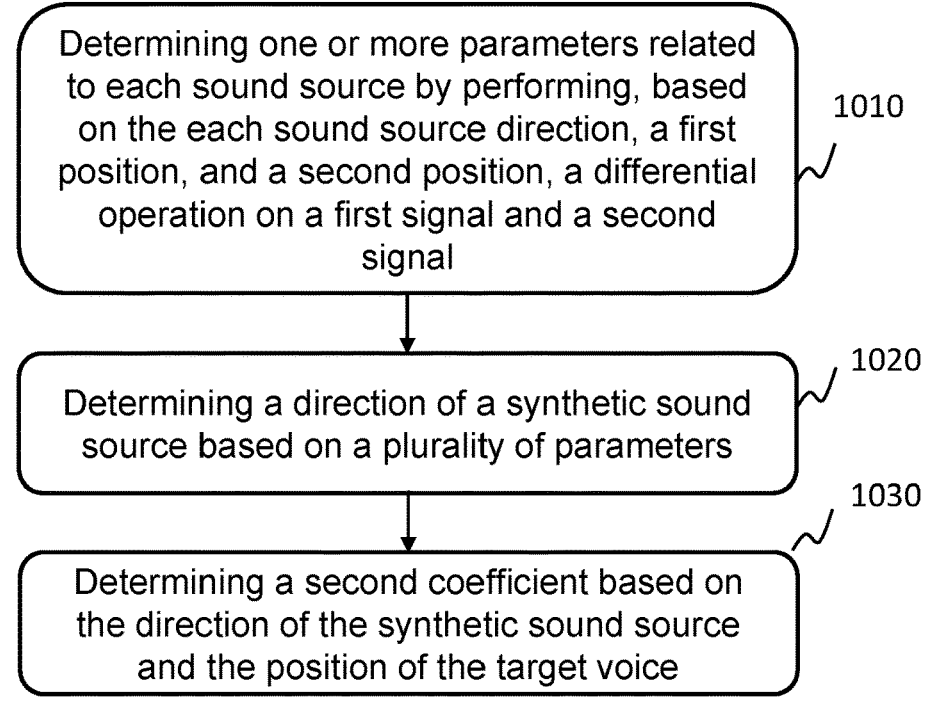
FIG. 10 is a flowchart illustrating an exemplary process for determining a second coefficient according to some embodiments of the present disclosure.

FIG. 10 is a flowchart illustrating an exemplary process for determining a second coefficient according to some embodiments of the present disclosure. In some embodiments, a method 1000 may be executed by the processing device 110, the processing engine 112, or the processor 220. For example, the method 1000 may be stored in a storage device (e.g., the storage device 140 or a storage unit of the processing device 110) in a form of a program or instructions, when the processing device 110, the processing engine 112, the processor 220, or the modules shown in FIG. 4 execute the program or the instructions, the method 1000 may be implemented.

In some embodiments, the operations 530 and 540 described in method 500 may be implemented by the method 1000. In some embodiments, the method 1000 may be accomplished with one or more additional operations/processes not described below, and/or without one or more operations/processes discussed below. Additionally, an order of the operations/processes shown in FIG. 10 is not limiting. As shown in FIG. 10, the method 1000 may include the following operations.

In 1010, the processing device 110 may determine one or more parameters related to each sound source direction of plurality of sound source directions by performing, based on the each sound source direction, a first position, and a second position, a differential operation on a first signal and a second signal.

In some embodiments, the plurality of sound source directions may include one or more preset sound source directions. The sound source directions may be selected and/or adjusted according to actual needs, which are not limited here. For example, the plurality of sound sources may have preset incident angles $\theta=(\theta_1, \theta_2, \ldots, \theta_1)$ (e.g., 0°, 3°, 60°, 90°, 120°, 150°, 180°, etc.). The processing device 110 may perform the differential operation on the first signal and the second signal based on each sound source direction, the first position, and the second position. For example, each sound source direction in the plurality of sound source directions may correspond to a time delay, and the processing device 110 may construct a time delay combination $\tau=(\tau_1, \tau_2, \ldots, \tau_n)$ corresponding to the plurality of sound source directions. Based on the time delay combination, the processing device 110 may perform the differential operation on the first signal and the second signal to construct a plurality of directional microphones. Poles of the plurality of directional microphones may point to the plurality of sound source directions, respectively. A response of each of the plurality of directional microphones may have a cardioid shape. For the convenience of description, the cardioid shape corresponding to one of the plurality of sound source directions may be referred to as simulated cardioid shape. The pole of the simulated cardioid shape may point to a corresponding sound source direction.

In some embodiments, the processing device 110 may determine one or more parameters related to each sound source direction based on the differential operation. The one or more parameters may include a likelihood function. For example, for each signal point of a current frame, the processing device 110 may determine a likelihood function corresponding to each sound source direction in the plurality of sound source directions. For example, the likelihood function may be represented as the following Equation:

$$LH_i(f,t)=-|\exp(-i\pi f\theta_i)sig1(f,t)-sig2(f,t)|^2, \quad (8)$$

where $LH_i(f, t)$ denotes a likelihood function corresponding to a frequency f at a moment t, sig1(f, t) and sig2(f, t) are time-frequency domain expressions of the first signal and the second signal, respectively when the sound source direction is $\theta_i$, and the $-2\pi f\theta_i$ in $\exp(-i2\pi f\theta_i)$ sig1(f, t) denotes a phase difference of the sound source propagating to the second position relative to the first position when the sound source direction is $\theta_i$.

In some embodiments, the likelihood function may correspond to a probability that a sound is emitted from the sound source direction to form the first signal and the second signal. Merely by way of example, the likelihood function value when the sound source direction is θ=30° is 0.8, which indicates that the probability that a sound is emitted from the sound source direction θ=30° to form the first signal and the second signal is 80%. In some embodiments, a response of the likelihood function corresponding to one of the plurality of sound source directions may have a cardioid shape. For the convenience of description, the cardioid shape corresponding to the likelihood function may be referred to as a synthetic cardioid shape (or an actual cardioid shape).

In 1020, the processing device 110 may determine a direction of a synthetic sound source based on a plurality of parameters.

In some embodiments, to determine the direction of the synthetic sound source, the processing device 110 may determine a parameter with the greatest value in the plurality of parameters. For example, the processing device 110 may determine the likelihood functions $LH_1(f, t), LH_2(f, t), \ldots, LH_n(f, t)$ corresponding to the plurality of sound source directions $\theta=(\theta_1, \theta_2, \ldots, \theta_n)$. The likelihood function $LH_i(f, t)$ may correspond to a probability that a sound is emitted from a sound source direction $\theta_i$ to form the first signal and the second signal. The likelihood function with the greatest value may indicate that the probability that a sound is emitted from a sound source direction to form the first signal and the second signal is the greatest. In such cases, the processing device 110 may determine that the sound source direction corresponding to the likelihood function with the greatest value is the direction of the synthetic sound source. For example, if the value of the likelihood function is the greatest when θ=30°, the processing device 110 may determine that the direction of the synthetic sound source is 30°.

In some embodiments, the processing device 110 may determine the direction of the synthetic sound source based on the plurality of directional microphones. According to the above embodiment, the plurality of directional microphones may respectively correspond to sound source directions $\theta=(\theta_1, \theta_2, \ldots, \theta_n)$. The response of each directional microphone is a simulated cardioid shape. The pole of the simulated cardioid shape points to the corresponding sound source direction. Further, the response of the likelihood function corresponding to one of the plurality of sound source directions may be a cardioid shape (also referred to as a synthetic cardioid shape). The pole of the synthetic cardioid shape points to the direction of the synthetic sound source. The processing device 110 may compare the synthetic cardioid shape with a plurality of simulated cardioid shapes corresponding to the plurality of directional microphones, and determine a simulated cardioid shape having a pole closest to the pole of the actual cardioid shape. The sound source direction corresponding to the simulated cardioid shape having the pole closest to the pole of the actual cardioid shape may be determined as the direction of the synthetic sound source.

In 1030, the processing device 110 may determine the second coefficient based on the direction of the synthetic sound source and the position of the target voice.

In some embodiments, to determine the second coefficient, the processing device 110 may determine whether the position of the target voice is located in the direction of the synthetic sound source. For example, the position of the target voice may be located on an extension line of a line connecting the dual microphones. That is, the sound source direction corresponding to the position of the target voice is $\theta=0°$. The processing device 110 may determine whether the direction of the synthetic sound source is $0°$. In response to determining that the direction of the synthetic sound source is $0°$, the position of the target voice may be located in the direction of the synthetic sound source. In some embodiments, the processing device 110 may determine whether the likelihood function with the greatest value is located in a set dominated by the target sound source. In response to determining that the likelihood function with the greatest value is located in the set dominated by the target sound source, the processing device 110 may determine that the position of the target voice is located in the direction of the synthetic sound source. In some embodiments, the set dominated by the target sound source may be represented as the following Equation:

$$\tilde{\Lambda}=\{(f,t):_{(f,t)}{}^{arg}LH_0(f,t)=\max LH_i(f,t)\}, \quad (9)$$

where $LH_0(f, t)$ denotes a value of the likelihood function when the position of the target voice is located in the direction of the synthetic sound source. Based on the set $\tilde{\Lambda}$, the processing device 110 may determine a time-frequency point (f, t) such that the likelihood function corresponding to the time-frequency point (f, t) takes the maximum value $\max LH_i(f, t)$ when $\theta=0°$. At this time, the signal (e.g., the first signal or the third signal) corresponding to the time-frequency point may be a signal emitted from the target sound source direction.

It should be noted that the set $\tilde{\Lambda}$ dominated by the target sound source shown in Equation (9) is only an example. In Equation (9), the position of the target voice is located on an extension line of the line connecting the dual microphones (i.e., $\theta=0°$) such that the likelihood function corresponding to the time-frequency point (f, t) determined based on the above method reaches the maximum value at $\theta=0°$. Optionally or additionally, the position of the target voice may not be located on the extension line of the line connecting the dual microphones (that is, $\theta\neq 0°$). For example, an angle between the position of the target voice and the extension line of the line connecting the dual microphones is 30 degrees. Correspondingly, the $LH_0(f,t)$ in Equation (9) may be a value of the likelihood function when $\theta=30°$. That is, the time-frequency point (f, t) obtained based on the set dominated by the target sound source may make the likelihood function take the maximum value when $\theta=30°$.

In some embodiments, in response to determining that the position of the target voice is located in the direction of the synthetic sound source, the processing device 110 may set the second coefficient as a first value (e.g., 1). In response to determining that the position of the target voice is not located in the direction of the synthetic sound source, the processing device 110 may set the second coefficient as a second value (e.g., 0). In some embodiments, the processing device 110 may process, based on the second coefficient, the first signal, or the third signal obtained after an ANF filtering operation. For example, taking the first signal as an example, the second coefficient may be used as a weight of the first signal. For example, when the second coefficient is 1, it indicates that the first signal is reserved. On the contrary, when the position of the target voice is not located at the direction of the synthetic sound source, the first signal corresponding to the direction of the synthetic sound source may be regarded as a noise signal. The processing device 110 may set the second coefficient as zero. In such cases, the processing device 110 may filter or attenuate the noise signal when the position of the target voice is not located in the direction of the synthetic sound source based on the second coefficient.

In some embodiments, the second coefficient may constitute a masking matrix for filtering an input signal (e.g., the first signal or the third signal). For example, the masking matrix may be represented as the following Equation:

$$M = \begin{cases} 1, & (f,t) \in \tilde{\Lambda} \\ 0, & \text{otherwise} \end{cases} \quad (10)$$

The above masking matrix M is a binarization matrix, which may directly remove the input signal that determined as the noise signal. Therefore, a voice signal processed based on the masking matrix may cause problems such as a spectrum leakage, a voice discontinuity, etc. In some embodiments, the processing device 110 may perform a smoothing operation on the second coefficient based on a smoothing factor. For example, based on the smoothing factor, the processing device 110 may perform the smoothing operation on the second coefficient in the time domain. The smoothing operation in the time domain may be represented as the following Equation:

$$\tilde{M}(f,t)=\alpha M(f,t-1)+(1-\alpha)M(f,t), \quad (11)$$

where $\alpha$ denotes the smoothing factor, $M(f, t-1)$ denotes the masking matrix corresponding to a previous frame, and $M(f, t)$ denotes the masking matrix corresponding to a current frame. The smoothing factor $\alpha$ may be used to weight the masking matrix of the previous frame and the masking matrix of the current frame to obtain a smooth masking matrix $\tilde{M}(f, t)$ corresponding to the current frame.

In some embodiments, the processing device 110 may further perform the smoothing operation on the second coefficient in the frequency domain. For example, the processing device 110 may perform the smoothing operation on the second coefficients using a sliding Hamming window.

In some embodiments, the processing device 110 may determine the second coefficient through a regression function based on the angle between the position of the target voice and the direction of the synthetic sound source. For example, for each time-frequency point, the processing device 110 may determine likelihood functions $LH_1(f, t)$, $LH_2(f, t)$, ..., $LH_n(f, t)$ corresponding to the plurality of sound source directions $\theta=(\theta_1, \theta_2, \ldots, \theta_n)$. The processing device may further determine the sound source direction corresponding to the likelihood function with the greatest value as the direction of the synthetic sound source. For example, if the value of the likelihood function is the greatest at $\theta_i=30°$, the processing device 110 may determine that the direction of the synthetic sound source is 30°. Further, the processing device 110 may determine the second coefficient through the regression function based on the angle between the target sound source direction and the direction of the synthetic sound source. For example, the processing device 110 may construct the regression function between the angle and the second coefficient. In some embodiments, the regression function may include a smooth regression function, e.g., a linear regression function. Merely by way of example, the value of the regression function may decrease as the angle between the target sound source direction and the direction of the synthetic sound source increases. In such cases, when the second coefficient is used as a weight to process the input signal, the input signal when the angle between the target sound source direction and the direction of the synthetic sound source is relatively large may be weakened or removed, so as to achieve a noise reduction.

It should be noted that the above description of the method 1000 is only for the convenience of description, and does not limit the present disclosure to the scope of the embodiments. It should be understood that, after understanding the principle of the method, those skilled in the art may make any combination of various operations, or may add or delete any operations without departing from the principle.

According to some embodiments of the present disclosure, the processing device 110 may acquire the signals of the target voice through dual microphones, and perform a filtering operation on the signals of the target voice based on a dual-mic filtering algorithm. For example, when an angle difference between the noise signal and a valid signal is relatively great (that is, the angle difference between the noise source direction and the target sound source direction is relatively great), the processing device 110 may perform a filtering operation based on the first coefficient to remove the noise signal. When the angle difference between the noise signal and the valid signal is relatively small, the processing device 110 may perform the filtering operation based on the second coefficient. In such cases, the processing device 110 may filter out the noise signal in the signals of the target voice. In some embodiments, the first output voice signal obtained after the dual-mic filtering operation may include a residual noise. For example, on some frequency sub-bands (e.g., a mid-high frequency sub-band), the first output voice signal may include a continuous noise on a magnitude spectrum. In some embodiments, the processing device 110 may further perform a post-filtering operation on the first output voice signal based on a single-mic filtering algorithm.

Figure 11:
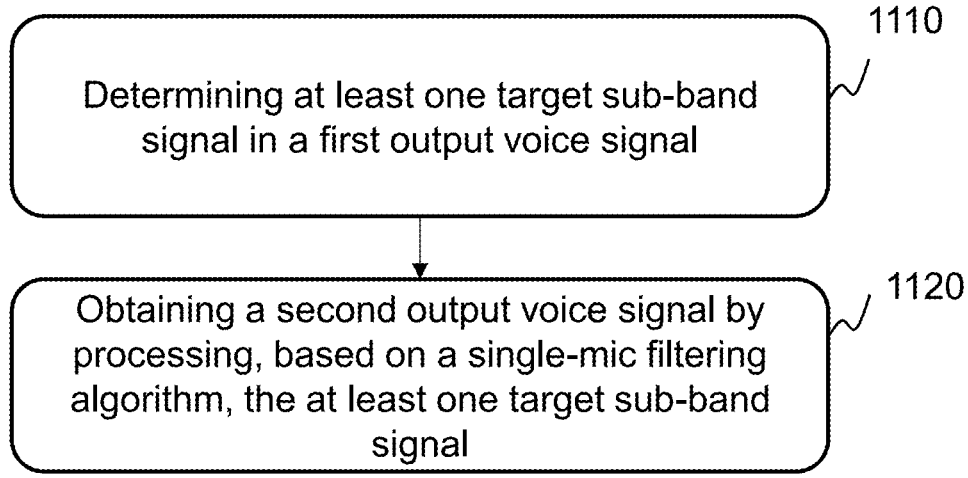
FIG. 11 is a flowchart illustrating an exemplary process for single-mic filtering according to some embodiments of the present disclosure.

FIG. 11 is a flowchart illustrating an exemplary process for single-mic filtering operation according to some embodiments of the present disclosure. In some embodiments, a method 1100 may be executed by the processing device 110, the processing engine 112, or the processor 220. For example, the method 1100 may be stored in a storage device (e.g., the storage device 140 or a storage unit of the processing device 110) in a form of a program or instructions, when the processing device 110, the processing engine 112, the processor 220 or the modules shown in FIG. 4 execute the program or the instructions, the method 1100 may be implemented. In some embodiments, method 1100 may be accomplished with one or more additional operations/processes not described below, and/or without one or more operations/processes discussed below. Additionally, an order of the operations/processes shown in FIG. 11 is not limiting. As shown in FIG. 11, the method 1100 may include the following operations.

In 1110, the processing device 110 (e.g., the processing module 420) may determine at least one target sub-band signal in a first output voice signal.

In some embodiments, the processing device 110 may determine the at least one target sub-band signal based on an SNR of each sub-band signal in the first output voice signal. In some embodiments, the processing device 110 may obtain a plurality of sub-band signals based on the first output voice signal. For example, the processing device 110 may obtain the plurality of sub-band signals by performing a sub-band division operation based on a signal frequency band. Merely by way of example, the processing device 110 may divide the first output voice signal into sub-bands according to a frequency band category including a low frequency, a medium frequency, or a high frequency, or may divide the first output voice signal according to a specific frequency bandwidth (e.g., every 2 kHz as a frequency band). As another example, the processing device 110 may perform the sub-band division based on a signal frequency point of the first output voice signal. The signal frequency point refers to a value after a decimal point in a frequency value of a signal. For example, if the frequency value of the signal is 72.810, then the signal frequency point of the signal is 810. The sub-band division performed based on the signal frequency point may be performed by dividing the signal into sub-bands according to a specific signal frequency width. For example, a signal frequency of 810-830 may be determined as a sub-band, and a signal frequency of 600-620 may be determined as a sub-band. In some embodiments, the processing device 110 may obtain the plurality of sub-band signals by performing a filtering operation, or may perform the sub-band division based on other algorithms or devices to obtain the plurality of sub-band signals, which are not limited here.

Further, the processing device 110 may determine the SNR of each sub-band signal. The SNR refers to a ratio of a voice signal energy to a noise signal energy. The signal energy may include a signal power, other energy data obtained based on the signal power, etc. In some embodiments, the greater the SNR, the smaller the noise contained in the voice signal. In some embodiments, the SNR of the sub-band signal may include a ratio of the energy of a pure voice signal (that is, a valid signal) to the energy of the noise signal in the sub-band signal. In some embodiments, the SNR may be a ratio of the energy of the sub-band signal containing the noise to the energy of the noise signal. In some embodiments, the processing device 110 may determine the SNR of each sub-band signal based on an SNR estimation algorithm. For example, for each sub-band signal, the processing device 110 may determine a noise signal value in the sub-band signal based on a noise estimation algorithm. Exemplary noise estimation algorithms may include a minimum pursuit algorithm, a temporal recursive averaging algorithm, etc., or any combination thereof. Further, the processing device 110 may determine the SNR based on a sub-band signal and the noise signal value. In some embodiments, the processing device 110 may use a trained SNR estimation model to determine the SNR of each sub-band signal. Exemplary SNR estimation models may include a multi-layer perceptron (MLP) model, a decision tree (DT) model, a deep neural network (DNN) model, a support vector machine (SVM) model, a K-Nearest Neighbor (KNN) algorithm, and other algorithms or models that can perform a feature extraction and/or classification. In some embodiments, the SNR estimation model may be obtained by training a preliminary model based on training samples. The training samples may include one or more voice signal samples (e.g., at least one historical voice signal, each of which contains the noise signal) and one or more label values of the one or more voice signal samples (e.g., the SNR of a historical voice signal v1 is 0.5, and the noise signal value of a historical voice signal v2 is 0.6). The one or more voice signal samples may be processed by the model to obtain a predicted SNR. A loss function may be constructed based on the predicted SNR and the one or more label values of the training samples, and a model parameter may be adjusted based on the loss function to reduce a difference between the predicted target SNR and the label value. For example, the model parameter may be updated or adjusted based on a gradient descent algorithm, etc. A plurality of iterations may be performed and when the trained model satisfies a preset condition, the training process may be finished and a trained SNR estimation model may be obtained. The preset condition may include that the loss function converges or is smaller than a preset threshold, etc.

Further, the processing device 110 may determine the target sub-band signal based on the SNR of each sub-band signal. In some embodiments, the processing device 110 may determine the target sub-band signal based on an SNR threshold. For example, for each sub-band signal, the processing device 110 may determine whether the SNR of the sub-band signal is less than the SNR threshold. In response to determining that the SNR of the sub-band signal is less than the SNR threshold, the processing device 110 may determine the sub-band signal as the target sub-band signal.

In some embodiments, the processing device 110 may determine the at least one target sub-band signal based on a preset sub-band range. For example, the preset sub-band range may be a preset frequency range. The preset frequency range may be determined based on an experience value. The experience value may be obtained during a voice analysis process. Merely by way of example, it is found in the voice analysis process that the voice signal in the frequency range of 3000 Hz-4000 Hz usually contains a great proportion of noise, accordingly, the preset frequency range may at least include 3000 Hz-4000 Hz.

In 1120, the processing device 110 (e.g., the generation module 430) may obtain a second output voice signal by processing, based on a single-mic filtering algorithm, the at least one target sub-band signal.

In some embodiments, the processing device 110 may process the at least one target sub-band signal based on a single-microphone filtering algorithm, thereby filtering out the noise in the at least one target sub-band signal and obtaining a noise-reduced second output voice signal. Exemplary single-mic filtering algorithms may include a spectral subtraction algorithm, a Wiener filtering algorithm, a recursive averaging algorithm for minimum control, a voice generation model algorithm, etc., or any combination thereof.

According to some embodiments of the present disclosure, the processing device 110 may process, based on the single-mic filtering algorithm, the first output voice signal obtained based on the dual-mic filtering algorithm. For example, the processing device 110 may perform the filtering operation on a portion of sub-band signals (e.g., the signal of a specific frequency) in the first output voice signal based on the single-mic filter algorithm to weaken or filter out the noise signal in the first output voice signal, thereby implementing a correction and/or supplement to the dual-mic filter algorithm.

It should be noted that the above description of the method 1100 is only for the convenience of description, and does not limit the scope of the present disclosure. It should be understood that, after understanding the principle of the method, those skilled in the art may make any combination of various operations, or may add or delete any operations without departing from this principle. For example, the operation 1110 may be omitted. The processing device 110 may not only perform the filtering operation on the target sub-band signal, but may also directly perform the filtering operation on the entire first output voice signal. As another example, the processing device 110 may automatically detect the noise signal in the first output voice signal based on an automatic noise detection algorithm, and perform the filtering operation on the detected noise signal based on the single-mic filtering algorithm.

Figure 12:
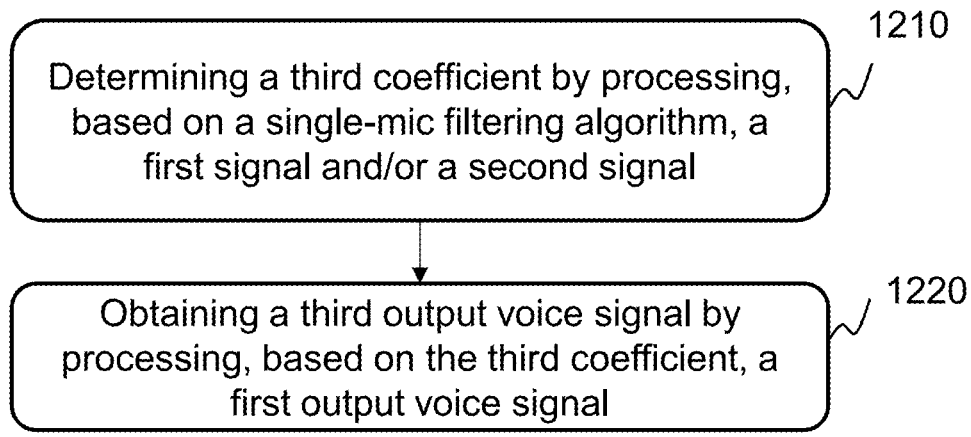
FIG. 12 is a flowchart illustrating an exemplary process for single-mic filtering according to some embodiments of the present disclosure.

FIG. 12 is a flowchart illustrating an exemplary process for single-mic filtering according to some embodiments of the present disclosure. In some embodiments, a method 1200 may be executed by the processing device 110, the processing engine 112, or the processor 220. For example, the method 1200 may be stored in a storage device (e.g., the storage device 140 or a storage unit of the processing device 110) in a form of a program or instructions, when the processing device 110, the processing engine 112, the processor 220 or the modules shown in FIG. 4 execute the program or the instructions, the method 1200 may be implemented In some embodiments, the method 1200 may be accomplished with one or more additional operations/processes not described below, and/or without one or more operations/processes discussed below. Additionally, an order of the operations/processes shown in FIG. 12 is not limiting. As shown in FIG. 12, the method 1200 may include the following operations.

In 1210, the processing device 110 (e.g., the processing module 420) may determine a third coefficient by processing, based on a single-mic filtering algorithm, the first signal, and/or the second signal.

In some embodiments, the processing device 110 may determine the third coefficient based on any one of the first signal and the second signal. For example, the processing device 110 may determine the third coefficient based on the first signal, or may determine the third coefficient based on the second signal. In some embodiments, the processing device 110 may determine the third coefficient based on the first signal and the second signal. For example, the processing device 110 may determine a first value of the third coefficient based on the first signal, determine a second value of the third coefficient based on the second signal, and determine the third coefficient based on the first value and the second value (e.g., by averaging, weighted summation, etc.).

Taking the first signal as an example, in some embodiments, the processing device 110 may process the first signal based on the single-mic filtering algorithm. Exemplary single-mic filtering algorithms may include a spectral subtraction algorithm, a Wiener filtering algorithm, a recursive averaging algorithm for minimum control, a voice generation model algorithm, etc., or any combination thereof. Merely by way of example, the processing device 110 may obtain a noise signal and a valid signal in the first signal based on the single-mic filter algorithm, and determine an SNR corresponding to the first signal based on at least two of the noise signal, the valid signal, and the first signal. The SNR corresponding to the first signal may include a priori SNR, a posteriori SNR, etc. The prior SNR may be a ratio of the energy of the valid signal to the energy of the noise signal. The posterior SNR may be a ratio of the energy of the valid signal to the energy of the first signal. Further, the processing device 110 may determine the third coefficient based on the SNR corresponding to the first signal. For example, the processing device 110 may determine a gain coefficient corresponding to the single-mic filtering algorithm based on the priori SNR and/or the posteriori SNR, and determine the third coefficient based on the gain coefficient. For example, the processing device 110 may directly use the gain coefficient as the third coefficient. As another example, the processing device 110 may determine a mapping relationship between the gain coefficient and the third coefficient, and determine the third coefficient based on the mapping relationship. The gain coefficient here refers to a transfer function in the single-mic filter algorithm. The transfer function may filter the voice signal with the noise signal to obtain the valid signal. For example, the transfer function may be in a form of a matrix, and the noise signal in the voice signal may be filtered out by multiplying the transfer function by the voice signal with the noise signal. Correspondingly, the third coefficient may be used to remove noise in the voice signal.

Optionally or additionally, the processing device 110 may further obtain a smoothed SNR by performing a weighted combination on the prior SNR and the posterior SNR using a smoothing factor based on a logistic regression algorithm (e.g., a sigmoid function). Further, the processing device 110 may determine the gain coefficient corresponding to the single-mic filter algorithm based on the smoothed SNR and determine the gain coefficient as the third coefficient. In such cases, the third coefficient may have a better smoothness such that a strong musical noise may be avoided when the single-mic filter algorithm is used in the filtering operation.

In 1220, the processing device 110 (e.g., a generation module) may obtain a third output voice signal by processing, based on the third coefficient, the first output voice signal.

In some embodiments, the processing device 110 may multiply the third coefficient by the first output voice signal to obtain the third output voice signal. For example, according to operation 1210, the third coefficient may be the gain coefficient obtained based on the single-mic filter algorithm. By multiplying the gain coefficient with the first output voice signal, the noise signal in the first output voice signal may be filtered out.

It should be noted that the above description of the method 1200 is only for the convenience of description, and does not limit the scope of the present disclosure. It should be understood that, after understanding the principle of the method, those skilled in the art may make any combination of various operations, or may add or delete any operations without departing from this principle.

Figure 13:
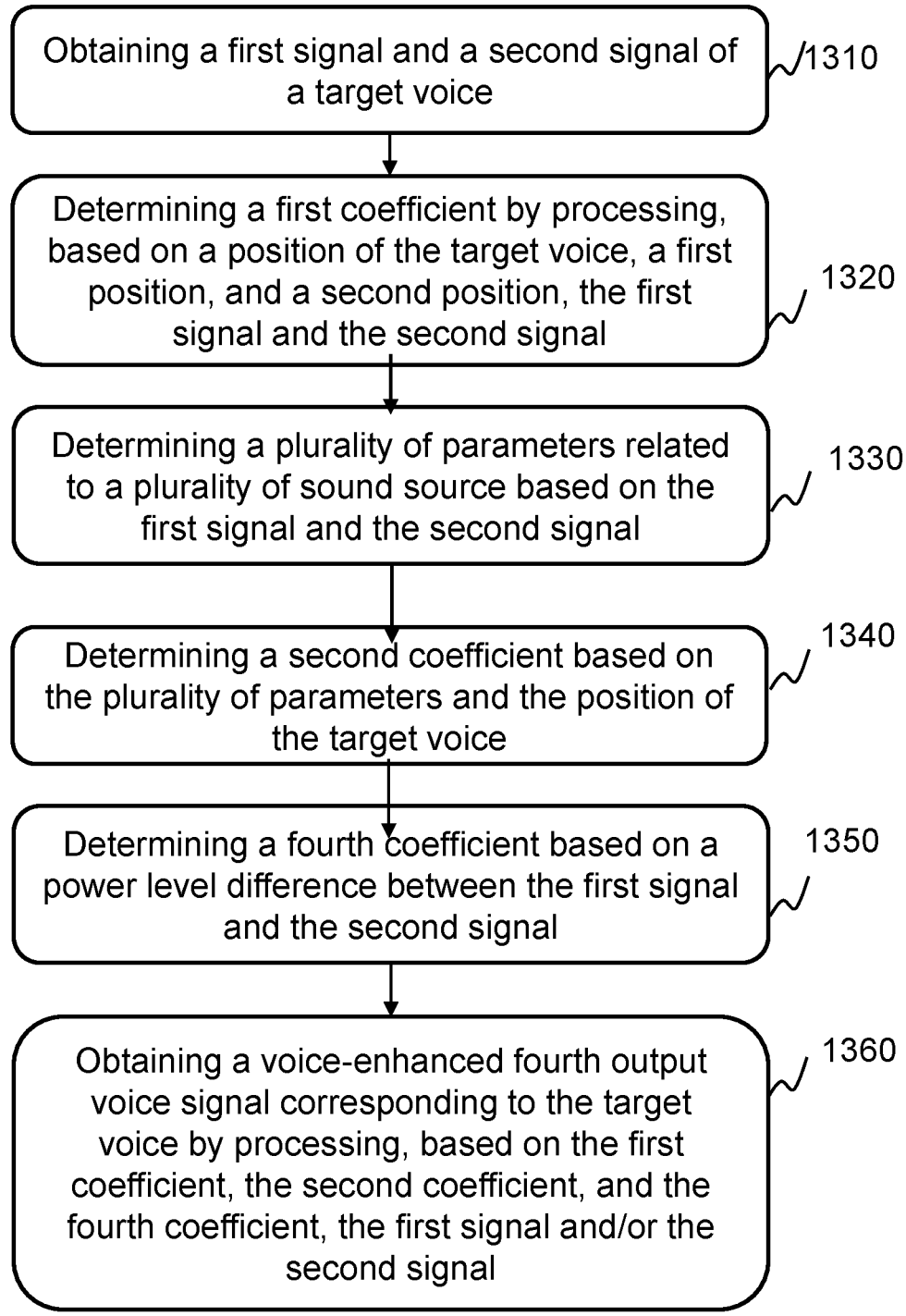
FIG. 13 is a flowchart illustrating an exemplary process for voice enhancement according to some embodiments of the present disclosure.

FIG. 13 is a flowchart illustrating an exemplary process for voice enhancement according to some embodiments of the present disclosure. In some embodiments, a method 1300 may be executed by the processing device 110, the processing engine 112, or the processor 220. For example, the method 1300 may be stored in a storage device (e.g., the storage device 140 or a storage unit of the processing device 110) in a form of a program or instructions, when the processing device 110, the processing engine 112, the processor 220 or the modules shown in FIG. 4 execute the program or the instructions, the method 1300 may be implemented. In some embodiments, the method 1300 may be accomplished with one or more additional operations/processes not described below, and/or without one or more operations/processes discussed below. Additionally, an order of the operations/processes shown in FIG. 13 is not limiting. As shown in FIG. 13, the method 1300 may include the following operations.

In 1310, the processing device 110 may obtain a first signal and a second signal of a target voice.

In 1320, the processing device 110 may determine a first coefficient by processing, based on a position of the target voice, a first position, and a second position, the first signal and the second signal.

In 1330, the processing device 110 may determine, based on the first signal and the second signal, a plurality of parameters related to a plurality of sound source directions.

In 1340, the processing device 110 may determine, based on the plurality of parameters and the position of the target voice, a second coefficient.

In some embodiments, operations 1310-1340 may be performed according to operations 510-540 described in connection with FIG. 5, which are not repeated here.

In 1350, the processing device 110 (e.g., the processing module 420) may determine a fourth coefficient based on a power level difference between the first signal and the second signal.

In some embodiments, to determine the fourth coefficient, the processing device 110 may obtain a noise power spectral density based on a silent interval in the first signal and the second signal. The silent interval may be a voice signal interval in which there is no valid signal (that is, no voice is emitted by a target sound source). In the silent interval, since there is no voice from the target sound source, the first signal and the second signal obtained by the dual microphones only contain a noise component. In some embodiments, the processing device 110 may determine the silent interval in the first signal and the second signal based on a voice activity detection (VAD) algorithm. In some embodiments, the processing device 110 may respectively determine one or more voice intervals in the first signal and the second signal as the silent intervals. For example, for each of the first signal and the second signal, the processing device 110 may directly determine a voice interval (e.g., 200 ms, 300 ms, etc.) at the beginning of the signal as the silent interval. Further, the processing device 110 may obtain the noise power density spectrum based on the silent interval. In some embodiments, when the noise signal source is far away from the dual microphones, the noise signals received by the two microphones may be similar or identical. In such cases, the processing device 110 may obtain the noise power spectral density based on the silent interval corresponding to any one of the first signal or the second signal. In some embodiments, the processing device 110 may obtain the noise power spectral density based on a periodogram algorithm. Optionally or additionally, the processing device 110 may transform the first signal and/or the second signal into a frequency domain based on an FFT operation to obtain the noise power spectral density based on the periodogram algorithm in the frequency domain.

Further, the processing device 110 may obtain the power level difference based on a first power spectral density of the first signal, a second power spectral density of the second signal, and the noise power spectral density. In some embodiments, the processing device 110 may determine the first power spectral density of the first signal and the second power spectral density of the second signal based on the periodogram algorithm. In some embodiments, the processing device 110 may obtain the power level difference based on a power level difference (PLD) algorithm. In the PLD algorithm, it may be assumed that a distance between the dual microphones is relatively far such that the power level difference between the valid signal in the first signal and the valid signal in the second signal is relatively great, and the noise signals in the first signal and the second signal are the same or similar. Thus, the power level difference between the first signal and the second signal may be expressed as a function related to the valid signal in the first signal.

Further, the processing device 110 may determine the fourth coefficient based on the power level difference and the noise power spectral density. In some embodiments, the processing device 110 may determine a gain coefficient based on the PLD algorithm, and determine the gain coefficient as the fourth coefficient.

In 1360, the processing device 110 (e.g., the generation module) may obtain a voice-enhanced fourth output voice signal corresponding to the target voice by processing, based on the first coefficient, the second coefficient, and the fourth coefficient, the first signal, and/or the second signal.

In some embodiments, the processing device 110 may perform a gain compensation operation on the first signal and/or the second signal based on the fourth coefficient to obtain an estimated valid signal. For example, the estimated valid signal may be a product of the fourth coefficient and the first signal and/or a product of the fourth coefficient and the second signal. In some embodiments, the processing device 110 may weight, based on the first coefficient, the second coefficient, and the fourth coefficient, an output signal (e.g., a third signal, the estimated valid signal) obtained based on the first signal and/or the second signal. For example, the processing device 110 may weight the third signal, the first signal, and the estimated valid signal based on the first coefficient, the second coefficient, and the fourth coefficient, respectively, and determine the fourth output voice signal based on weighted signals. For example, the fourth output voice signal may be an average value of the weighted signals. As another example, the fourth output voice signal may be a greater value in the weighted signals.

In some embodiments, the processing device 110 may obtain a voice-enhanced first output voice signal corresponding to the target voice by processing, based on the first coefficient and the second coefficient, the first signal and/or the second signal, and obtain the fourth output voice signal by processing the first output voice signal based on the fourth coefficient.

It should be noted that the above description of the method 1300 is only for the convenience of description, and does not limit the scope of the present disclosure. It should be understood that, after understanding the principle of the method, those skilled in the art may make any combination of various operations, or may add or delete any operations without departing from this principle. In some embodiments, the processing device 110 may further determine the fourth coefficient based on a power difference between the first signal and the second signal. In some embodiments, the processing device 110 may further determine the fourth coefficient based on a magnitude difference between the first signal and the second signal.

The possible beneficial effects of the embodiments of the present disclosure include: (1) the target voice signal is processed based on the ANF algorithm such that a relatively small damage may be generated to the target voice signal, and when the angle difference between the valid signal and the noise signal is great, the noise signal may be effectively filtered; (2) by processing the target voice signal based on a dual-mic filtering algorithm, the noise signal near the target sound source may be effectively filtered when the angle difference between the valid signal and the noise signal is small; (3) by combining the dual-mic filtering and the single-mic filtering to process the target voice signal, the residual noise after the dual-mic filtering may be effectively filtered out.

The basic concepts have been described above, and obviously, for those skilled in the art, the above disclosure of the present disclosure is only an example, and does not constitute a limitation to the present disclosure. Although not expressly stated here, those skilled in the art may make various modifications, improvements, and corrections to the present disclosure. Such modifications, improvements and corrections are suggested in the present disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment," "an embodiment" and/or "some embodiments" mean a certain feature, structure or characteristic related to at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, certain features, structures, or characteristics in one or more embodiments of the present disclosure may be properly combined.

In addition, those skilled in the art may appreciate that various aspects of the present disclosure may be illustrated and described in several patentable categories or situations, including any new and useful process, machine, product or combination of substances or any new and useful improvements thereof. Correspondingly, various aspects of the present disclosure may be entirely executed by hardware, may be entirely executed by software (including firmware, resident software, microcode, etc.), or may be executed by a combination of hardware and software. The above hardware or software can be referred to as "data block," "module," "engine," "unit," "component" or "system". Additionally, aspects of the present disclosure may be embodied as a computer product comprising computer readable program codes on one or more computer readable media.

In addition, unless clearly stated in the claims, the order of processing elements and sequences, the use of numbers and letters, or the use of other names in the present disclosure are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may further be implemented as a software only solution, e.g., an installation on an existing server or mobile device.

In the same way, it should be noted that in order to simplify the expression disclosed in the present disclosure and help the understanding of one or more embodiments of the present disclosure, in the foregoing description of the embodiments of the present disclosure, sometimes multiple features are combined into one embodiment, drawings or descriptions thereof. This method of disclosure does not, however, imply that the subject matter of the present disclosure requires more features than are recited in the claims. Rather, the claimed subject matter may lie in less than all features of a single foregoing disclosed embodiment.

In some embodiments, numbers describing the quantity of components and attributes are used. It should be understood that such numbers used in the description of the embodiments use modifiers such as "about," "approximately," or "substantially" to modify. Unless otherwise stated, the "about," "approximately," or "substantially" indicates that the figure allows for a variation of ±20%. Accordingly, in some embodiments, the numerical parameters set forth in the description and attached claims are approximations that may vary depending upon the desired properties sought to be obtained by a particular embodiment. In some embodiments, the numerical data should consider the specified significant digits and use an algorithm reserved for general digits. Although the numerical ranges and data used in certain embodiments of the present disclosure to confirm the breadth of the ranges are approximations, in specific embodiments, such numerical values are set as precisely as practicable.

What is claimed is:

1. A method for voice enhancement, comprising:
    obtaining a first signal and a second signal of a target voice, the first signal being a signal of the target voice collected based on a first position, and the second signal being a signal of the target voice collected based on a second position;
    determining a first coefficient by processing, based on a position of the target voice, the first position, and the second position, the first signal and the second signal;
    determining, based on the first signal and the second signal, a plurality of parameters related to a plurality of sound source directions, each parameter of the plurality of parameters corresponding to a probability that a sound is emitted from a sound source direction to form the first signal and the second signal;
    determining, based on the plurality of parameters and the position of the target voice, a second coefficient, comprising:
        determining a direction of a synthetic sound source based on the plurality of parameters, including:
            determining that a sound source direction corresponding to a parameter with the greatest value among the plurality of parameters is the direction of the synthetic sound source; and
            determining, based on the direction of the synthetic sound source and the position of the target voice, the second coefficient; and
    obtaining a voice-enhanced first output voice signal corresponding to the target voice by processing, based on the first coefficient and the second coefficient, the first signal and/or the second signal.

2. The method of claim 1, wherein the determining a first coefficient by processing, based on a position of the target voice, the first position, and the second position, the first signal and the second signal comprises:
    obtaining a signal pointing to a first direction and a signal pointing to a second direction by performing, based on the position of the target voice, the first position, and the second position, a differential operation on the first signal and the second signal, the signal pointing to the first direction and the signal pointing to the second direction containing different proportions of a valid signal;
    determining a third signal corresponding to the valid signal based on the signal pointing to the first direction and the signal pointing to the second direction; and
    determining the first coefficient based on the third signal.

3. The method of claim 2, wherein the determining a third signal corresponding to the valid signal comprises:
    determining a fourth signal by performing an adaptive differential operation on the signal pointing to the first direction and the signal pointing to the second direction; and
    obtaining the third signal by enhancing a low-frequency component in the fourth signal.

4. The method of claim 3, further comprising:
    updating one or more adaptive parameters of the adaptive differential operation based on the fourth signal, the signal pointing to the first direction, and the signal pointing to the second direction.

5. The method of claim 1, wherein the determining a first coefficient by processing, based on a position of the target voice, the first position, and the second position, the first signal and the second signal, comprises:
    obtaining a signal pointing to the first direction and a signal pointing to the second direction by performing, based on the position of the target voice, the first position, and the second position, a differential operation on the first signal and the second signal, the signal pointing to the first direction and the signal pointing to the second direction containing different proportions of a valid signal;
    determining an estimated signal-to-noise ratio (SNR) of the target voice based on the signal pointing to the first direction and the signal pointing to the second direction; and
    determining the first coefficient based on the estimated SNR.

6. The method of claim 1, wherein the determining, based on the first signal and the second signal, a plurality of parameters related to a plurality of sound source directions comprises:
    determining one or more parameters related to each sound source direction by performing, based on the each sound source direction, the first position, and the second position, a differential operation on the first signal and the second signal.

7. The method of claim 1, wherein the determining, based on the direction of the synthetic sound source and the position of the target voice, the second coefficient comprises:
    determining whether the position of the target voice is located in the direction of the synthetic sound source;
    in response to determining that the position of the target voice is located in the direction of the synthetic sound source, setting the second coefficient as a first value; or
    in response to determining that the position of the target voice is not located in the direction of the synthetic sound source, setting the second coefficient as a second value.

8. The method of claim 1, wherein the determining, based on the direction of the synthetic sound source and the position of the target voice, the second coefficient comprises:

determining, based on an angle between the position of the target voice and the direction of the synthetic sound source, the second coefficient using a regression function.

9. The method of claim 1, further comprising:
performing a smoothing operation on the second coefficient based on a smoothing factor.

10. The method of claim 1, further comprising performing at least one of the following operations on the first signal and the second signal:
framing the first signal and the second signal;
performing a windowed smoothing operation on the first signal and the second signal; or
converting the first signal and the second signal to a frequency domain.

11. The method of claim 10, further comprising:
determining a fourth coefficient based on a power level difference between the first signal and the second signal; and
obtaining a voice-enhanced fourth output voice signal corresponding to the target voice by processing, based on the first coefficient, the second coefficient, and the fourth coefficient, the first signal and/or the second signal.

12. The method of claim 11, wherein the determining a fourth coefficient based on a power level difference between the first signal and the second signal comprises:
obtaining a noise power spectral density based on a silent interval in the first signal and the second signal;
obtaining the power level difference based on a first power spectral density of the first signal, a second power spectral density of the second signal, and the noise power spectral density; and
determining the fourth coefficient based on the power level difference and the noise power spectral density.

13. The method of claim 1, further comprising:
determining at least one target sub-band signal in the first output voice signal; and
obtaining a second output voice signal by processing, based on a single-mic filtering algorithm, the at least one target sub-band signal.

14. The method of claim 13, wherein the determining at least one target sub-band signal in the first output voice signal comprises:
obtaining a plurality of sub-band signals based on the first output voice signal;
determining an SNR of each of the sub-band signals; and
determining, based on the SNR of each of the sub-band signals, the target sub-band signal.

15. The method of claim 1, further comprising:
determining a third coefficient by processing, based on a single-mic filtering algorithm, the first signal and/or the second signal; and
obtaining a third output voice signal by processing, based on the third coefficient, the first output voice signal.

16. The method of claim 1, wherein
the determining, based on the first signal and the second signal, a plurality of parameters related to a plurality of sound source directions comprises:
constructing a plurality of directional microphones whose poles point to the plurality of sound source directions, respectively, wherein
a cardioid shape corresponding to each of the plurality of sound source directions is a simulated cardioid shape;
a pole of each simulated cardioid shape points to a corresponding sound source direction;
and
determining, based on the first signal and the second signal, a likelihood function corresponding to the each sound source direction in the plurality of sound source directions, wherein a cardioid shape corresponding to the likelihood function is a synthetic cardioid shape;
and
the determining a direction of a synthetic sound source based on the plurality of parameters further comprises:
determining a simulated cardioid shape that is closest to a pole of an actual cardioid shape; and
determining a sound source direction corresponding to the simulated cardioid shape as the direction of the synthetic sound source.

17. A system for voice enhancement, comprising:
at least one storage medium including a group of instructions; and
at least one processor in communication with the at least one storage medium, wherein when executing the group of instructions, the at least one processor is directed to cause the system to:
obtain a first signal and a second signal of a target voice, the first signal being a signal of the target voice collected based on a first position, and the second signal being a signal of the target voice collected based on a second position;
determine a first coefficient by processing, based on a position of the target voice, the first position, and the second position, the first signal and the second signal;
determine, based on the first signal and the second signal, a plurality of parameters related to a plurality of sound source directions, each parameter of the plurality of parameters corresponding to a probability that a sound is emitted from a sound source direction to form the first signal and the second signal;
determine, based on the plurality of parameters and the position of the target voice, a second coefficient, wherein to determine, based on the plurality of parameters and the position of the target voice, the second coefficient, the system is further caused to:
determine a direction of a synthetic sound source based on the plurality of parameters, wherein to determine the direction of the synthetic sound source based on the plurality of parameters, the system is further caused to:
determine that a sound source direction corresponding to a parameter with the greatest value among the plurality of parameters is the direction of the synthetic sound source;
and
determine, based on the direction of the synthetic sound source and the position of the target voice, the second coefficient;
and
obtain a voice-enhanced first output voice signal corresponding to the target voice by processing, based on the first coefficient and the second coefficient, the first signal and/or the second signal.

18. The system of claim 17, wherein to determine a first coefficient by processing, based on a position of the target voice, the first position, and the second position, the first signal and the second signal, the at least one processor is directed to cause the system to:
obtain a signal pointing to the first direction and a signal pointing to the second direction by performing, based on the position of the target voice, the first position, and the second position, a differential operation on the first signal and the second signal, the signal pointing to the first direction and the signal pointing to the second direction containing different proportions of valid signals;
determine an estimated signal-to-noise ratio (SNR) of the target voice based on the signal pointing to the first direction and the signal pointing to the second direction, and
determine the first coefficient based on the estimated SNR.

19. A non-transitory computer-readable storage medium storing computer instructions that, when executed by at least one processor, direct the at least one processor to perform a method comprising:
obtaining a first signal and a second signal of a target voice, the first signal being a signal of the target voice collected based on a first position, and the second signal being a signal of the target voice collected based on a second position;
determining a first coefficient by processing, based on a position of the target voice, the first position, and the second position, the first signal and the second signal;
determining, based on the first signal and the second signal, a plurality of parameters related to a plurality of sound source directions, each parameter of the plurality of parameters corresponding to a probability that a sound is emitted from a sound source direction to form the first signal and the second signal;
determining, based on the plurality of parameters and the position of the target voice, a second coefficient, comprising:
determining a direction of a synthetic sound source based on the plurality of parameters, including:
determining that a sound source direction corresponding to a parameter with the greatest value among the plurality of parameters is the direction of the synthetic sound source;
and
determining, based on the direction of the synthetic sound source and the position of the target voice, the second coefficient;
and
obtaining a voice-enhanced first output voice signal corresponding to the target voice by processing, based on the first coefficient and the second coefficient, the first signal and/or the second signal.

* * * * *